United States Patent [19]
Okawa et al.

[11] Patent Number: 5,410,847
[45] Date of Patent: May 2, 1995

[54] JUNCTION STRUCTURE BETWEEN STEEL MEMBER AND STRUCTURAL MEMBER

[75] Inventors: Yasuo Okawa; Akiyoshi Ito; Hiroshi Hayasaka, all of Tokyo; Toshio Saeki; Naoki Tanaka, both of Chofu; Kiyobumi Sugawara, Sendai, all of Japan

[73] Assignee: Kajima Corporation, Tokyo, Japan

[21] Appl. No.: 192,066

[22] Filed: Feb. 4, 1994

Related U.S. Application Data

[63] Continuation of Ser. No. 805,049, Dec. 11, 1991, abandoned.

[30] Foreign Application Priority Data

| Dec. 12, 1990 | [JP] | Japan | 2-401568 |
|---|---|---|---|
| Dec. 17, 1990 | [JP] | Japan | 2-402791 |
| Jan. 18, 1991 | [JP] | Japan | 3-004324 |
| Feb. 25, 1991 | [JP] | Japan | 3-030002 |
| Mar. 18, 1991 | [JP] | Japan | 3-051890 |
| Mar. 18, 1991 | [JP] | Japan | 3-051891 |

[51] Int. Cl.$^6$ .......................... E04B 1/24; E04B 1/58
[52] U.S. Cl. ........................ 52/272; 52/721; 52/295; 52/583.1; 403/346; 403/408.1
[58] Field of Search .............. 52/272, 721, 295–297, 52/280, 283, 587, 263; 403/408, 346, 347

[56] References Cited

U.S. PATENT DOCUMENTS

| 1,333,523 | 3/1920 | Williams | 52/295 |
|---|---|---|---|
| 2,569,669 | 10/1951 | Henderson | 52/587 |
| 2,920,475 | 1/1960 | Graham | 52/587 |
| 3,261,135 | 7/1966 | Knabe | 52/301 |
| 3,369,334 | 2/1968 | Berg | 52/227 |
| 3,513,610 | 5/1970 | Devonport | 52/587 |
| 3,787,134 | 1/1974 | Burr | 52/280 |
| 4,111,578 | 9/1978 | Sato et al. | 403/189 |
| 4,905,436 | 3/1990 | Matsuo et al. | 403/189 |

FOREIGN PATENT DOCUMENTS

| 921528 | 1/1947 | France | 52/283 |
|---|---|---|---|
| 1067871 | 6/1954 | France . | |
| 260134 | 10/1989 | Japan . | |
| 260135 | 10/1989 | Japan . | |
| 275818 | 11/1989 | Japan . | |
| 275819 | 11/1989 | Japan . | |
| 275820 | 11/1989 | Japan . | |
| 278636 | 11/1989 | Japan . | |
| 278637 | 11/1989 | Japan . | |
| 261140 | 10/1990 | Japan . | |
| 261141 | 10/1990 | Japan . | |
| 261142 | 10/1990 | Japan . | |
| 272122 | 11/1990 | Japan . | |
| 2272122 | 11/1990 | Japan | 52/721 |
| 2272125 | 11/1990 | Japan | 52/722 |
| 21735 | 1/1991 | Japan . | |
| 390760 | 4/1991 | Japan | 52/721 |
| 3125735 | 5/1991 | Japan | 52/722 |
| 893213 | 4/1962 | United Kingdom . | |
| 1037570 | 7/1966 | United Kingdom . | |
| 1418192 | 12/1975 | United Kingdom | 52/263 |

*Primary Examiner*—James L. Ridgill, Jr.
*Attorney, Agent, or Firm*—Knobbe, Martens, Olson & Bear

[57] ABSTRACT

A junction for connecting a steel member to a structural member, such as a beam in a steel framed construction to a column in a reinforced concrete construction, a steel framed concrete construction or a steel framed construction. Junction hardware connect to the steel member and a rod-like orthogonal metal connector is provided in concrete structural members. The elements are connected by tightening bolts or by screw joints through a coupler. Since the metal connector is in a form of rod, the concrete member has a high packing property. Field welding work is omitted by connecting the metal connector to the junction hardware by a bolt connection method or by a screw joint method to facilitate assembly. Furthermore, the intermediate portion of the metal connector may have a flat or curved shape or a metal connector orthogonal to the intermediate portion may have a passable through hole, and thus the bolt portion of both metal connectors are positioned at the same level as are the heights of the top ends of the steel beams intersecting at right angles.

38 Claims, 35 Drawing Sheets

FIG. 9
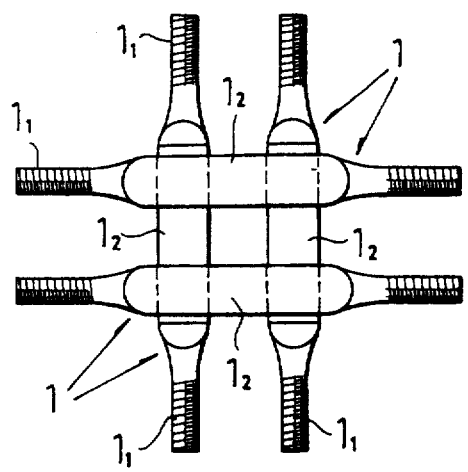
FIG. 10
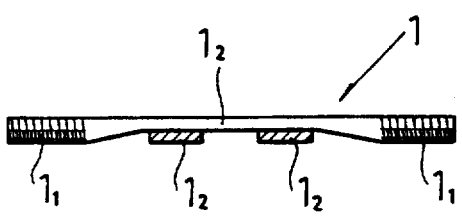
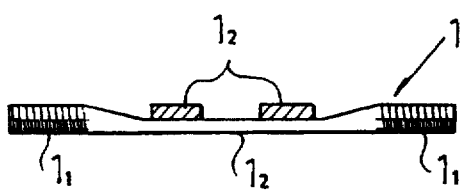

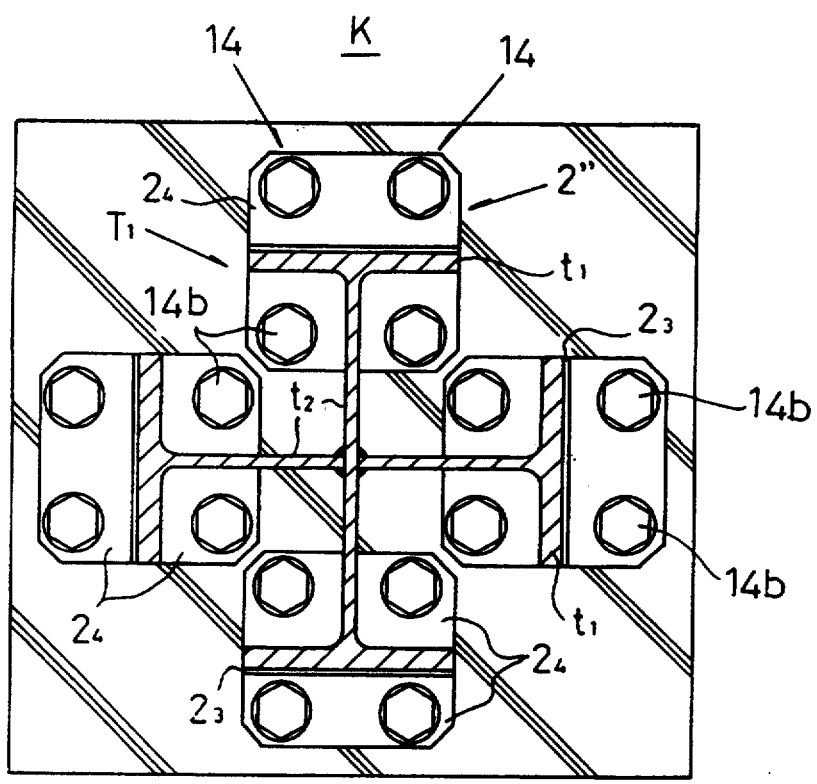
F I G. 47

JUNCTION STRUCTURE BETWEEN STEEL MEMBER AND STRUCTURAL MEMBER

This is a file wrapper continuation of U.S. patent application Ser. No. 805,049, filed Dec. 11, 1991 now abandoned by inventors Yasuo Okawa et al. and entitled "JUNCTION STRUCTURE BETWEEN STEEL MEMBER AND STRUCTURAL MEMBER."

BACKGROUND OF THE INVENTION

1. Field of the Invention

This invention relates to a junction structure between a steel member and a structural member, and more particularly, to a junction structure between a steel member and a structural member utilizing junction hardware arranged on the steel member and a metal connector arranged on the structural member. In this invention, the steel member includes a steel beam whereas the structural member includes a reinforced concrete column, a steel framed concrete column or a steel column.

2. Description of the Prior Art

In case the steel member is a beam and the structural member is either a reinforced concrete structure or a steel framed concrete structure column, a number of methods for connecting the steel beam to the column have been proposed and practiced as well. However, particularly, in case steels are provided in concrete and columns are in a steel frame reinforced concrete construction, a method has been generally applied that joint plates are crossed over between a diaphragm connected at a junction position of a steel column and a flange of a bracket of a steel beam or an edge portion thereof and connected by tightening bolts. In case the columns are in a reinforced concrete construction, there are representative methods: such as a method for connecting bolt-like junction hardware provided in the concrete and projected from side surfaces of the columns to the flange of the steel beam by tightening bolts, and another method for butting steel beams against the side surface of the concrete and connecting end plates matched to an end surface thereof to bolts buried into the concrete.

With reference to the method for connecting the steel beams to the steel column through the diaphragm, there are not so many advantages in building beams in a form of steel framed construction due to the similar arrangement of the junction between columns and beams in the normal steel framed reinforced concrete construction. In addition, there is a problem of insufficient concrete packing or filling in the concrete because the diaphragm blocks the section of the columns.

With respect to the method of using the bolt-like junction hardware having, at both ends thereof, the plate portions projecting from the side surface of the column, the concrete packing and the workability for the arrangement of column reinforcement are all satisfactory. However, as the plate portion expands to the beam side from the side surface of the column, the sizes of the steel beams facing one another across the column are limited, and in case the beams are mutually different, they cannot be applied and a step difference is produced between orthogonal junction hardware. Therefore, it is necessary to insert a filler plate so as to arrange the steel beams in orthogonal directions at the same level, and at the same time, it becomes difficult to site a bed type frame due to the generation of the step difference.

With reference to the method for butting the steel beams against the side surface of the column, after connecting the bolts buried into the column concrete in advance and projected from the side surface to the end plates, packing materials such as mortar are packed around this junction, but it is not suitable for the columns in a poured-in-place concrete construction because it will become necessary to position the bolts. In addition, as a step difference is produced between orthogonal bolts, there is a similar problem to that in case of using the junction hardware, and at the same time, the positions of the bolt holes of the hardware such as end plates connected to beam edge portions differ in an orthogonal direction to bring about the complication in processing the hardware.

In case the columns are built in a steel framed construction, a method for inserting diaphragms into the upper and lower flange positions of the steel beams in the steel column for the smooth transmission of the stress from the steel beams and the reinforcement of the steel column is generally employed.

The basic arrangement of the diaphragms in this case is roughly divided into two forms: a form of inserting them into the inside of the flange in the steel column and another form of protruding them into the external circumferences.

In case the steel column having a closed cross-section such as those of square steel pipes and is packed with concrete in an internal portion thereof to give the column in a steel framed concrete construction or in a steel framed reinforced concrete construction, there is a method for placing stiffeners vertically considering the concrete packing problem and a method for rolling band plates around the external circumference of the steel column, but a method by normally using diaphragms because of the dependability of stress transmission is general. In case the diaphragms get into the internal portion of the steel column, the sufficient packing of concrete is secured by making an opening in this.

In the method for inserting the diaphragm into the internal portion of the steel column, at least the portion of the junction is composed of box-like steel pipes in an assembled form or the steel pipes are once cut at the junction position, provided therein and the diaphragms are then welded to assemble. In any cases, the resulting assembling depends on welding, and therefore, particularly, due to a number of butted welding amounts, it takes a lot of labor and time to proceed the processing and assembling operation.

In the method for protruding the diaphragms into the external circumference, it becomes necessary to divide the diaphragm into a plurality of pieces resulting in an increase in the number of parts, and the amount to be welded is required in the same degree as that in case of inserting into the internal portion. Therefore, the complication in processing and assembling work cannot be avoided, similar to the internal diaphragm method.

In case the steel member is a column, in the method for rigidly connecting the column base in the steel column in a steel framed construction or a steel framed reinforced concrete construction to a concrete base as a structural member, the shearing force from the column base is normally transmitted by a frictional force between the lower surface of a base plate and a top edge surface of the concrete base, and in case of exceeding the frictional force, the shearing force is borne by the shearing strength of anchor bolts. In case the shearing force particularly becomes excessive, however, the number of the anchor bolts or the total sectional area for the anchor bolts will have to be increased. However, a problem still remains because there is a limit in the number of anchor bolts available on the base plate which is determined by the minimum space requirements for clamping the bolts.

The present invention has been made on the basis of an understanding of all of the problems involving the junction between a steel member and a structural member such as a concrete member or the like, as well as the junction between the above-described steel beam and the column in a reinforced concrete construction, a steel framed concrete construction or a steel framed construction. Therefore, the present invention aims to newly propose a construction for overcoming the issues of the constructions in the prior art.

SUMMARY OF THE INVENTION

In this invention, a rod-like connector and junction hardware are utilized for connecting a structural member and a steel member. The rod-like metal connector is provided in the concrete of a reinforced concrete which are used as structural members. The rod-like metal connector has a cross-section capable of passing through the structural member. The junction hardware is connected to the edge portion of the steel member. The present invention resolves the problems of the construction in the prior art by connecting the steel member such as a steel beam or the like to the structural member such as a reinforced concrete construction column or a steel framed reinforced concrete construction column or a steel framed construction column by connecting the metal connector and the junction hardware with bolts or screw joints through couplers.

Metal connectors for connecting the steel beams to the reinforced concrete construction column, the steel framed concrete construction column or the steel framed construction column, have a sufficient length to cross between the opposite side surfaces of the column. An intermediate portion of the metal connector is placed in the concrete or by passing through the section. Bolt portions with cut male threads are formed at both ends of the metal connector to be connected with the junction hardware through the couplers or by passing through a portion of the junction hardware.

Since the metal connector used for the connection between the steel beam and the column has a rod shape, the concrete packing density level in case the column is in a concrete construction is high. In addition, field welding is omitted, and the workability is also improved by connecting the metal connectors to the junction hardware in the way of either a bolt connection or a screw joint.

The metal connectors are made such that the bolt portions of both metal connectors are positioned at the same vertical level with no step difference between the ends of orthogonal and bi-directional metal connectors. This is accomplished by utilizing a metal connector whose intermediate portion located within the column has a flat or curved shape or through-holes. As a result, the vertical levels of the top edges of the steel beams are equal which makes the assembly work of floor type frames easy while obviating the insertion of filler plates.

The heights of the bolt portions in the orthogonal and bi-directional metal connectors while crossing with each other within the column become equal since the centroid of the flat portion or curved portion are eccentric with respect to the axial center of the bolt portions.

The heights of the bolt portions in both metal connectors are kept equal in case the through holes for passing through the other metal connector are formed at the intermediate portion of the other orthogonal metal connector since the other metal connector passes through at the same level as the axis of the metal connector having through holes.

As for the junction hardware, use is made of a strap-shape hardware composed of a flat plate portion having a plurality of bolt-holes for connecting the flange of the steel beam by tightening bolts, and a bolt portion having an axis in parallel with the surface continuing to the flat plate portion, and to be connected to the bolt portion of the metal connector through a coupler. The other type of junction hardware is a split T-type hardware having a T-shape in section composed of a web connected to the flange of the steel beam by tightening bolts or by welding and a flange orthogonal to the web or a hardware in T-shape or L-shape in section in similar to the split T-shape hardware.

The metal connectors are connected to the junction hardware by facing both bolt portions to each other and by screwing into the coupler. The junction hardware having a split T-shape is connected to the metal connector by passing the bolt portions of the metal connector through the flanges and tightening the nuts or by screwing the couplers into the bolt portions and tightening the bolts passing through the flanges of the junction hardware from the other side.

As for the junction hardware having a T-shape in section similar to the split T-type hardware, the flanges are connected to the bolt portions of the metal connectors by tightening bolts while the web overlap on the flanges of the steel beams or by butting them against the flanges of the steel beams and welding.

A L-shape junction hardware has a shape dividing the split T-type hardware into halves with respect to the center line of the section, and two pieces make a pair. Each web holds both surfaces of the flange of the steel beam and is connected to the flange of the steel beam by tightening bolts, and the flange of the junction hardware is connected to the bolt portion of the metal connector.

The tensile force from each steel beam is transmitted directly to the steel beam on the opposite side through the junction hardware and the metal connectors or to the side surface of the concrete on the side of it. The compressive force is transmitted directly to the side surface of the concrete on the side of the junction hardware. In case of using the junction hardware in a form of strap, particularly, the axial lines of the bolts portions correspond to one another, and therefore, the transmission mechanism of stress is clear.

The junction hardware are connected to the bolt portions of the metal connectors on the side of the steel beams connected to the column, but they are not connected to the side of the column where the steel beam is not provided. Further, the junction hardware is not connected to the flanges at a down portion in case the assembly of the one-directionally facing steel beams having a difference in height.

The bolt portions of the metal connectors on the flanges at the down portion in case the assembly of the one-directionally facing steel beams is different or in case the column is not connected to the steel beams, that is, the bolt portions, to which the junction hardware is not connected, are fixed by nuts or couplers and bolts to the side surface of the column, and the transmission of the tensile force from the steel beams is completely made.

In case of connecting the steel columns as a steel member to the concrete base as a reinforced concrete member, a smooth and firm transmission of shearing force is made by burying the anchor bolts corresponding to the metal connectors used for the connection between the columns and the steel beams into the concrete base, then, connecting the junction hardware having L- and T-shapes in section which are similar to the split T-type hardware to the column base, projecting a shear key buried in the concrete on the concrete base side of this junction hardware, and transmitting the shearing force of the column base to the concrete base by this shear key.

Similarly to the case of being connected to the steel beams, the junction hardware in this case are fixed by the concrete base by connecting the flanges to those of the column base by tightening bolts or by welding to connect the anchor bolts to the webs.

The shear key projecting downwards from the web is buried in the concrete at the connection time of the anchor bolt, and the shearing force in a cross direction thereof is transmitted as a bearing pressure to the concrete base.

BRIEF DESCRIPTION OF THE DRAWINGS

The above-mentioned and other objects and features of the invention will become apparent from the following detailed description taken in conjunction with the drawings which indicate embodiments of the invention, in which:

FIG. 9 is a plan view showing the arrangement condition of a metal connector of an eccentric type at the intermediate portion;

FIG. 10 is an elevation view of FIG. 9;

FIG. 47 is a plan view of FIG. 46;

DETAILED DESCRIPTION OF THE PREFERRED EMBODIMENTS

Figure 1:
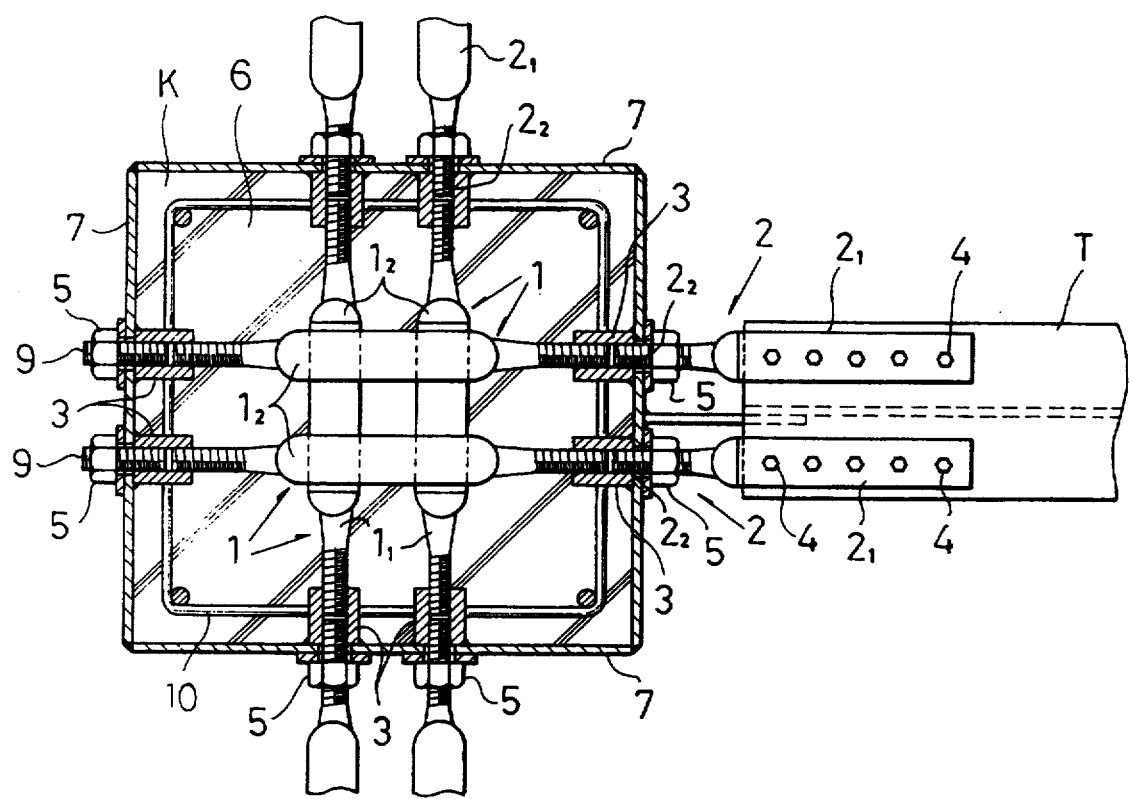
FIG. 1 is a plan view showing a column and beam junction using a metal connector with an eccentric intermediate portion and a junction hardware with a strap shape and connecting three pieces of steel beams bi-directionally to a reinforced concrete construction column.

By use of both a rod-like metal connector 1 provided in the concrete of a reinforced concrete construction column or a steel framed concrete construction column as a structural member K or provided while passing through the section of a steel column and a junction hardware 2 connected to the edge portion of a steel member T, the present invention is to connect between them with the points for bolt connection or with those for screw joints through couplers 3 and to connect the steel member T such as a steel beam, to the structural member K such as a reinforced concrete construction column, a steel framed concrete construction column or a steel framed construction column. Specifically, the invention provides a means to connect the beams as the steel member T to the column as the structural member K or the column as the steel member T to the concrete base as the structural member K. A steel framed concrete construction includes a steel framed reinforced concrete construction.

First of all, the junction structure between the steel beams as the steel member T and the reinforced concrete construction column, the steel framed concrete construction column or the steel framed construction column as the structural member K will be described with reference to FIG. 1 through FIG. 42. The steel beams and the columns are designated as T and K, respectively.

To begin with, each structure of a column and beam junction is described in FIG. 1 through FIG. 18 showing embodiments wherein the column K is a reinforced concrete construction column.

The metal connector 1 in case of connecting the steel beam T to either the column K in a reinforced concrete construction or in a steel framed concrete construction has a length sufficient to cross between the side surfaces of the column K, an intermediate portion $1_2$ thereof is buried in the concrete, bolt portions $1_1$, $1_1$ with cut male threads are formed at both edges for connecting to the junction hardware 2 and connected to the junction hardware 2 through couplers 3 for the points of screw joints or by passing through a flange $2_4$, i.e., a portion of the junction hardware 2 for the points of bolt connections.

In the metal container 1, either the intermediate portion $1_2$ positioned in the column K has a flat or curved shape or the metal connector 1 in the orthogonal direction to the intermediate portion $1_2$ has a passable through hole $1_3$ and the bolt portions $1_1$, $1_1$ of orthogonal and bi-directional metal connectors are provided at the same level.

FIG. 1 through FIG. 25 show the embodiments in case of connecting the steel beam T to the column K in a reinforced concrete construction using the metal connector 1 whose intermediate portion $1_2$ has a flat shape and whose centroid is eccentric to the axial center of the bolt portions $1_1$, at both edges thereof. Instead of such a metal connector 1, use is made of a metal connector 1 having a through hole $1_3$ at the intermediate portion $1_2$, which will be explained after FIG. 26, and a metal connector 1 curved at the intermediate portion $1_2$, which will be explained after FIG. 31.

Figure 3:
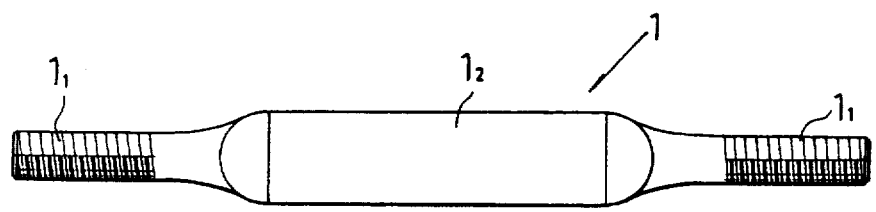
FIG. 3 is a plan view showing a manufacturing example of a metal connector in a flat shape in section at the intermediate portion and with an eccentric centroid to the axial center of a bolt portion.
Figure 4:
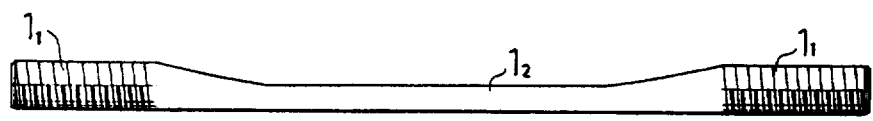
FIG. 4 is an elevation view of FIG. 3.
Figure 5:
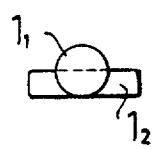
FIG. 5 is a side view of FIG. 4.

The metal connector 1, whose intermediate portion $1_2$ is eccentric and whose single body is shown in FIG. 3 through FIG. 5, is composed of the bolt portions $1_1$, $1_1$ with cut male threads and the intermediate portion $1_2$ which has a flat shape in section and is eccentric to the bolt portion $1_1$. The bolt portions $1_1$, $1_1$ of an orthogonal and bi-directional metal connector 1 are positioned at the same height as shown in FIG. 10 since the centroid of the intermediate portion $1_2$ becomes eccentric to the axis of the bolt portion $1_1$ as shown in FIG. 5.

Figure 6:
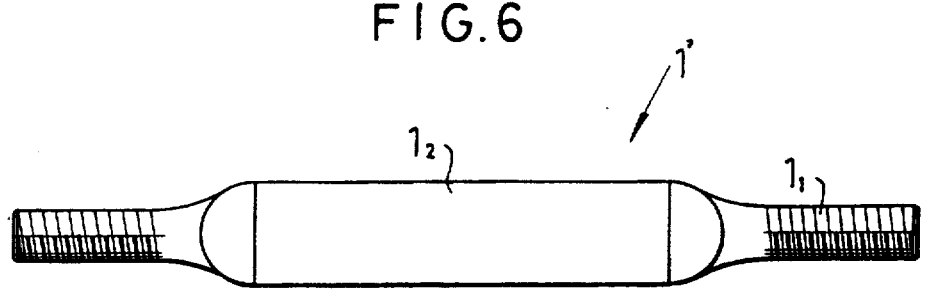
FIG. 6 is a plan view showing a manufacturing example of a metal connector of an eccentric type at the intermediate portion.
Figure 7:
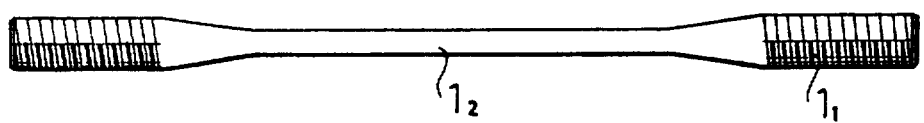
FIG. 7 is an elevation view of FIG. 6.
Figure 8:
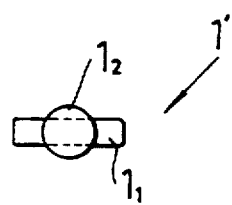
FIG. 8 is a side view of FIG. 7.

The metal connector 1 whose intermediate portion $1_2$ is eccentric to the bolt portion $1_1$ is used on the member whose flange levels of the assemblies of orthogonal steel beams T, T are same, that is, the upper flange side and the lower flange side in case the assemblies of the orthogonal steel beams T, T are same. The metal connector 1' whose intermediate portion $1_2$ is not eccentric to the bolt portion $1_1$ as shown in FIG. 6 through FIG. 8 is used on the lower flange side of the steel beam T on the small beam T assembly side in case the assemblies of the facing steel beams T, T across the column K are different.

The arrangement condition for crossed eccentric metal connectors 1 is shown in FIGS. 9 and 10. The perpendicular metal connectors 1, 1 positioning at each flange level of the steel beam T as shown in FIGS. 2, 9 and 10 are thus inverted in a mating relationship. These metal connectors 1, 1 are also provided in parallel with each other and in two rows between the flanges of the facing steel beams T, T as shown in FIG. 1, according to the number of the junction hardware 2 connected to the flange of the steel beam T or the number of the bolt portions $2_2$ of the junction hardware 2 described later.

Figure 2:
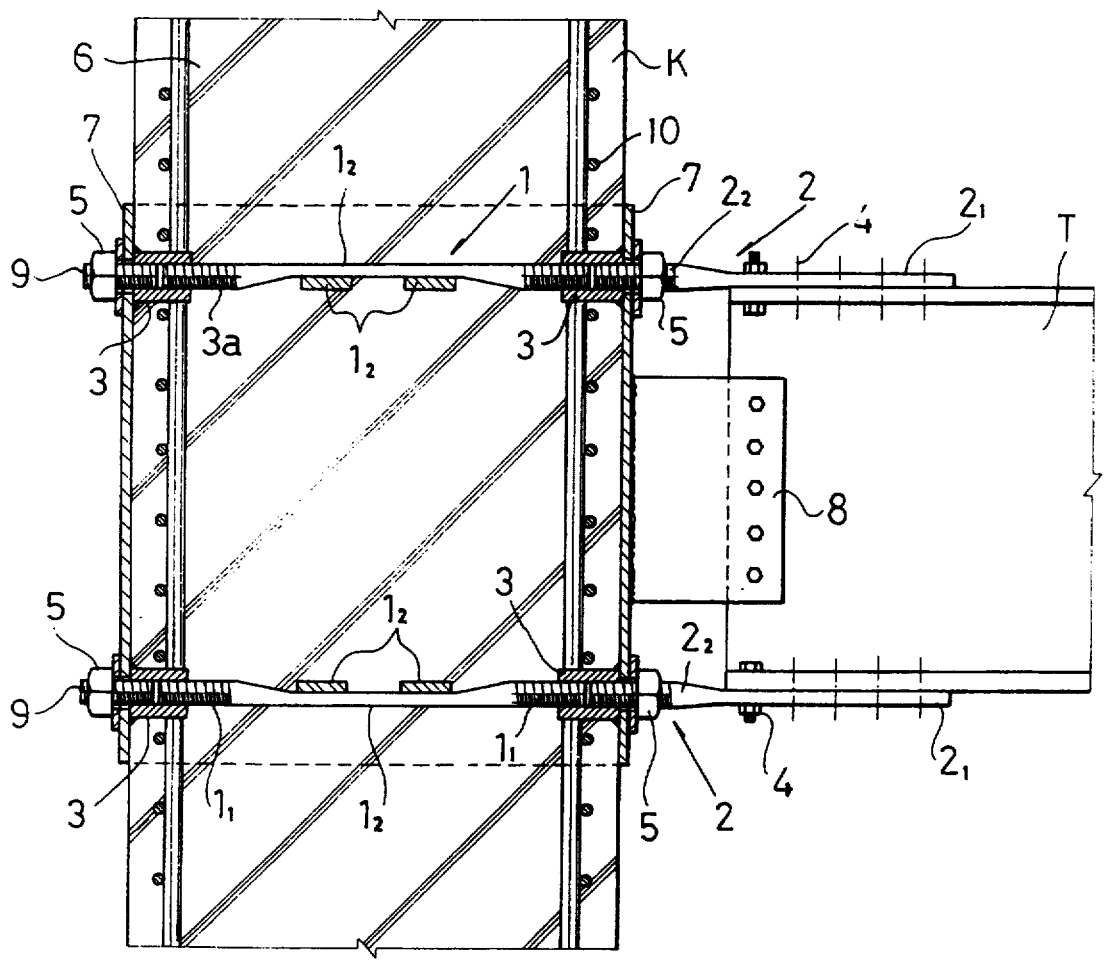
FIG. 2 is a longitudinal sectional view of FIG. 1.
Figure 17:
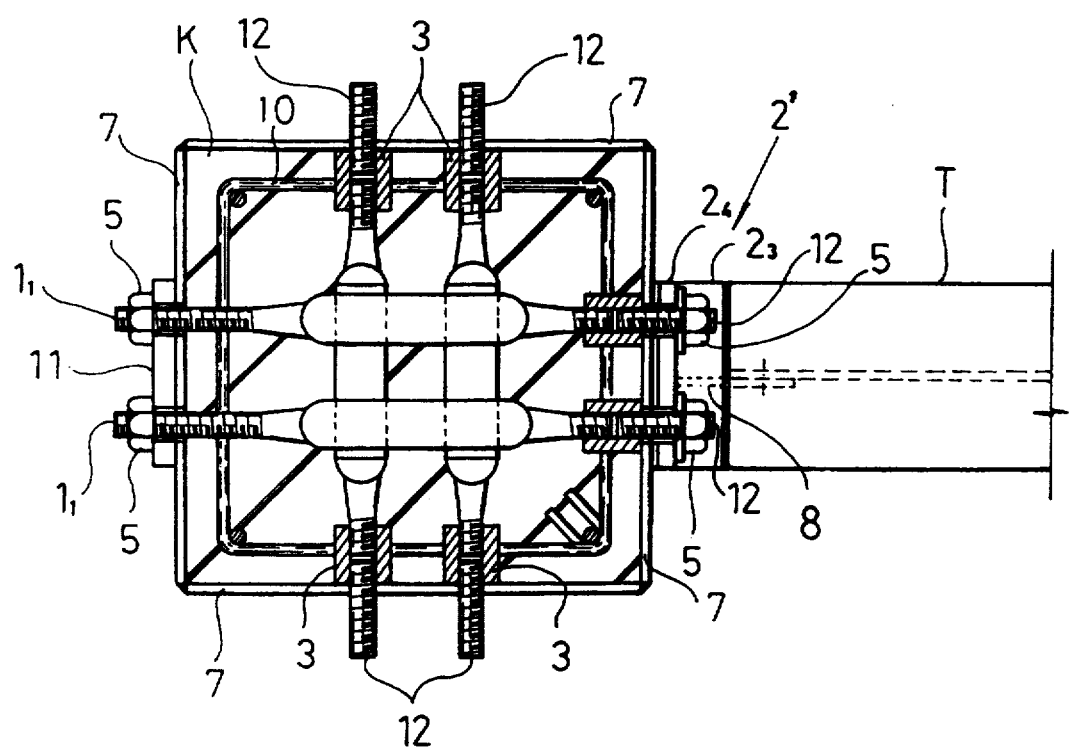
FIG. 17 is a plan view showing a junction using a junction hardware of a split T-type hardware and connected to three pieces of steel beams bi-directionally.
Figure 18:
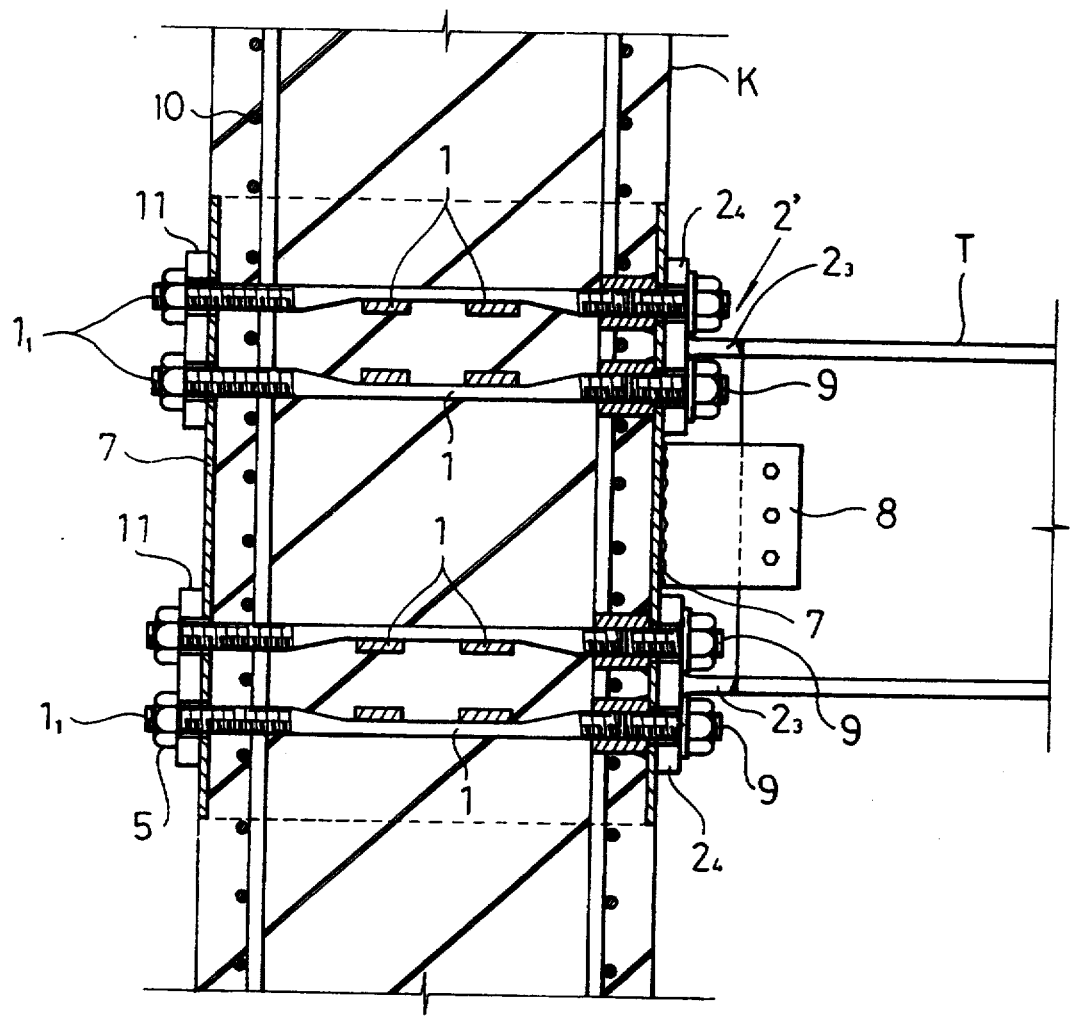
FIG. 18 is a longitudinal sectional view of FIG. 17.

As shown in FIGS. 1 and 2, couplers 3, 3 in the form of a long nut are screwed and connected to the bolt portions $1_1$, $1_1$ of the metal connector 1, and the junction hardware 2 connected to the steel beam T is connected by screwing directly into this coupler 3 or by screwing a bolt 12 passing through the flange $2_4$ of the junction hardware 2 into the coupler 3 as in FIGS. 17 and 18.

FIGS. 1 and 2 show an embodiment in case the junction hardware 2 with a strap shape is used.

The junction hardware 2 is composed of both a flat plate portion $2_1$ overlapped on the flange of the steel beam T, having a plurality of bolt holes and connected to the flange by tightening bolts 4, and a bolt portion $2_2$ continued to this plate portion $2_1$, having an axis in parallel with the plane of the plate portion and a male screw formed thereon. The junction hardware 2 is connected to the metal connector 1 on the axis of the bolt portion $1_1$ of the metal connector 1 since the bolt portion $2_2$ is screwed into the coupler 3 as illustrated. The junction hardware 2 is provided only on the side connected to the steel beam T.

Figure 11:
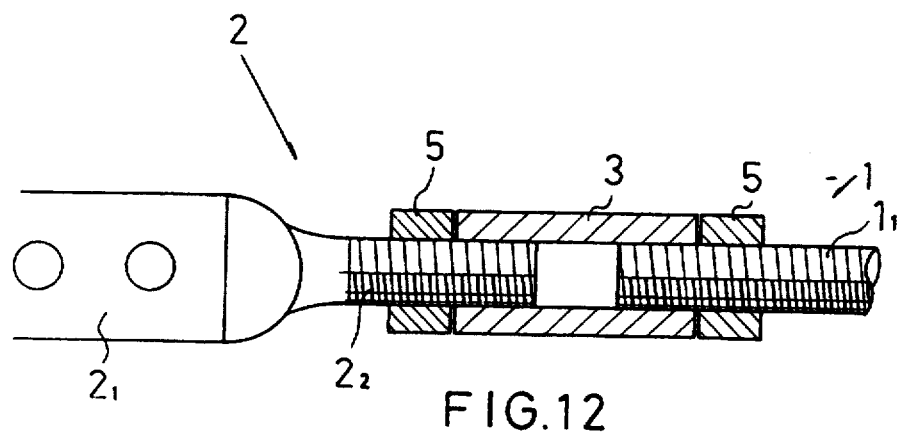
FIG. 11 is a sectional view showing the condition of the connection in case the diameters of both bolt portions in a metal connector and a junction hardware are equal to each other.
Figure 12:
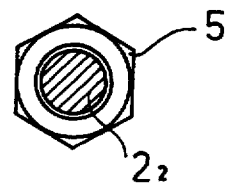
FIG. 12 is a sectional view in the axial direction of FIG. 11.

FIGS. 11 and 12 show the appearance of the connection by the metal connector 1 and the coupler 3 of the junction hardware 2.

As shown herein, the bolt portions $1_1$, $2_2$ of the metal connector 1 and the junction hardware 2 are connected by basically tightening nuts 5, 5 on both sides of the coupler 3 so as to introduce an axial force.

Figure 13:
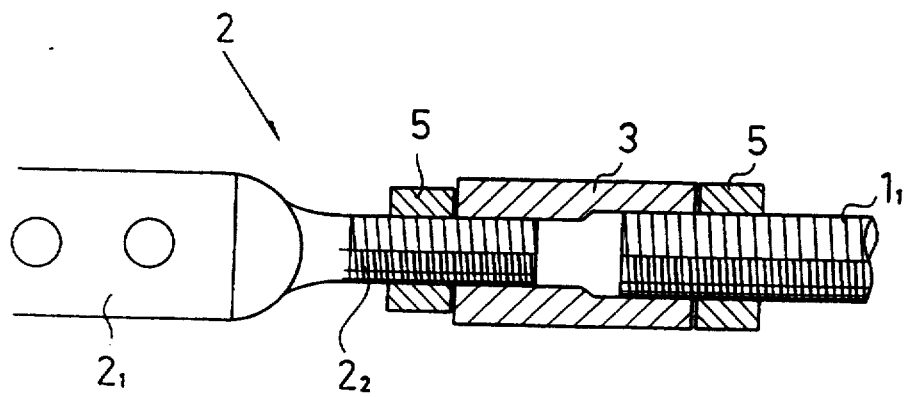
FIG. 13 is a sectional view showing the connection condition in case the diameters of both bolt portions in a metal connector and a junction hardware are different from each other.
Figure 14:
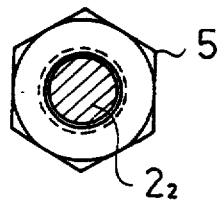
FIG. 14 is a sectional view in the axial direction of FIG. 13.

FIGS. 11 an 12 show the case the diameters of both bolt portions $1_1$, $2_2$ in the metal connector 1 and the junction hardware 2 are equal to each other, but FIGS. 13 and 14 show the appearance of the connection in case the diameters of both bolt portions $1_1$, $2_2$ in the metal connector 1 and the junction hardware 2 are different.

The coupler 3 restricts the concrete 6 of the junction from the circumference as shown in FIGS. 1 and 2 in case a column K has a reinforced concrete construction and is welded to a restriction plate 7 for transmitting the tensile force and the compressive force from the steel beams T as a bearing force, and the metal connector 1 is screwed in and attached to a required position. This restriction plate 7 is used both for a mold for the concrete 6 in the junction, and at the same time, it plays a role in transmitting the shearing force from the steel beam T to the column K by connecting a gusset plate 8 projected perpendicularly outward to the web of the steel beam T.

FIGS. 1 and 2 also show a junction in case the column K is a side column or the like, and three pieces of steel beams T are connected bi-directionally. By screwing a closed bolt 9 in the coupler 3 of the metal connector 1 on the side not connected to the steel beam T, or by projecting the edge portion of the bolt portion $1_1$ of the metal connector 1 from the coupler 3, and screwing a nut 5 thereon, the edge portion of the coupler 3 is thus closed, and the coupler 3, that is, the metal connector 1 is fixed to the restriction plate 7. The tightening of the nut 5 on the closed bolt 9 is done after the placing of the concrete 6 and after loading the reaction force of the tensile force introduced to the metal connector 1 is completed.

The junction portion is constituted by connecting the junction hardware 2 to the metal connector 1 under the condition that a necessary tensile force is applied to the metal connector 1 by providing the restriction plate 7 preliminarily attached with the coupler 3, in which the bolt portion $1_1$ of the metal connector 1 is screwed, arranging a hoop 10, pouring the concrete 6, screwing both the bolt portion $2_2$ of the junction hardware 2 and the closed bolt 9 in the coupler 3 after the hardening of the concrete 6, and firmly connecting the bolt portion $2_2$ and the nut 5 attached to the closed bolt 9 to each coupler 3.

The steel beam T is inserted from a cross direction thereof between both plate portions $2_1$, $2_1$ of the junction hardware 2, 2 arranged in parallel at upper and lower sides and connected to this by the bolts 4 at the flange.

The tensile force from the steel beam T is transmitted to the restriction plate 7 on the opposite side through the junction hardware 2 and the metal connector 1, and then transmitted to the concrete 6 in the junction as the bearing pressure as described above by the restriction plate 7. The compressive force is also transmitted by the nut 5 and a washer thereon directly to the restriction plate 7 connected to the bolt portion $2_2$ of the junction hardware 2, and has a distributed load into the concrete 6 by the fact that the restriction plate 7 has the corresponding height as the beam assembly.

The shearing force from the steel beam T is transmitted to the column K by the gusset plate 8 and the restriction plate 7.

Figure 15:
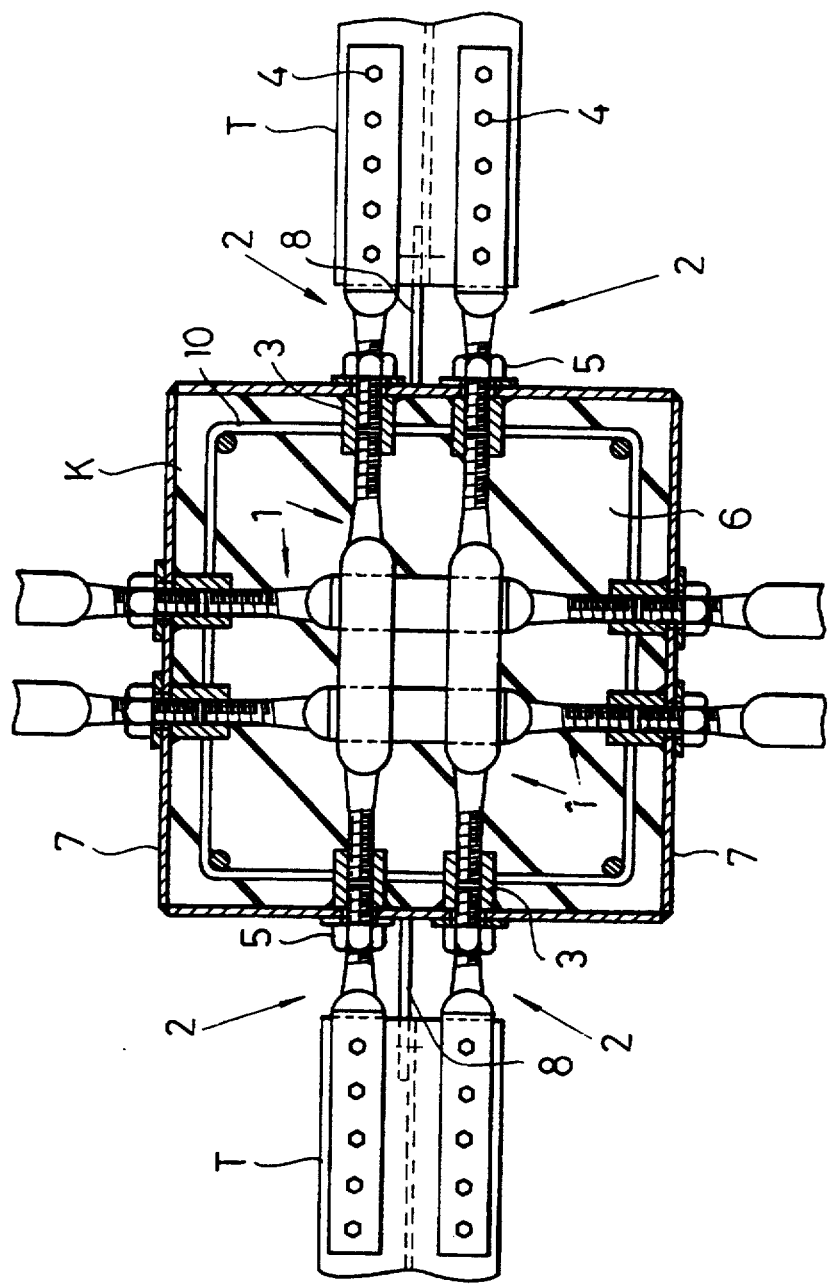
FIG. 15 is a plan view showing a junction in case four pieces of steel beams are bi-directionally connected to a reinforced concrete construction column and the assemblies of mutually facing steel beams are mutually different.
Figure 16:
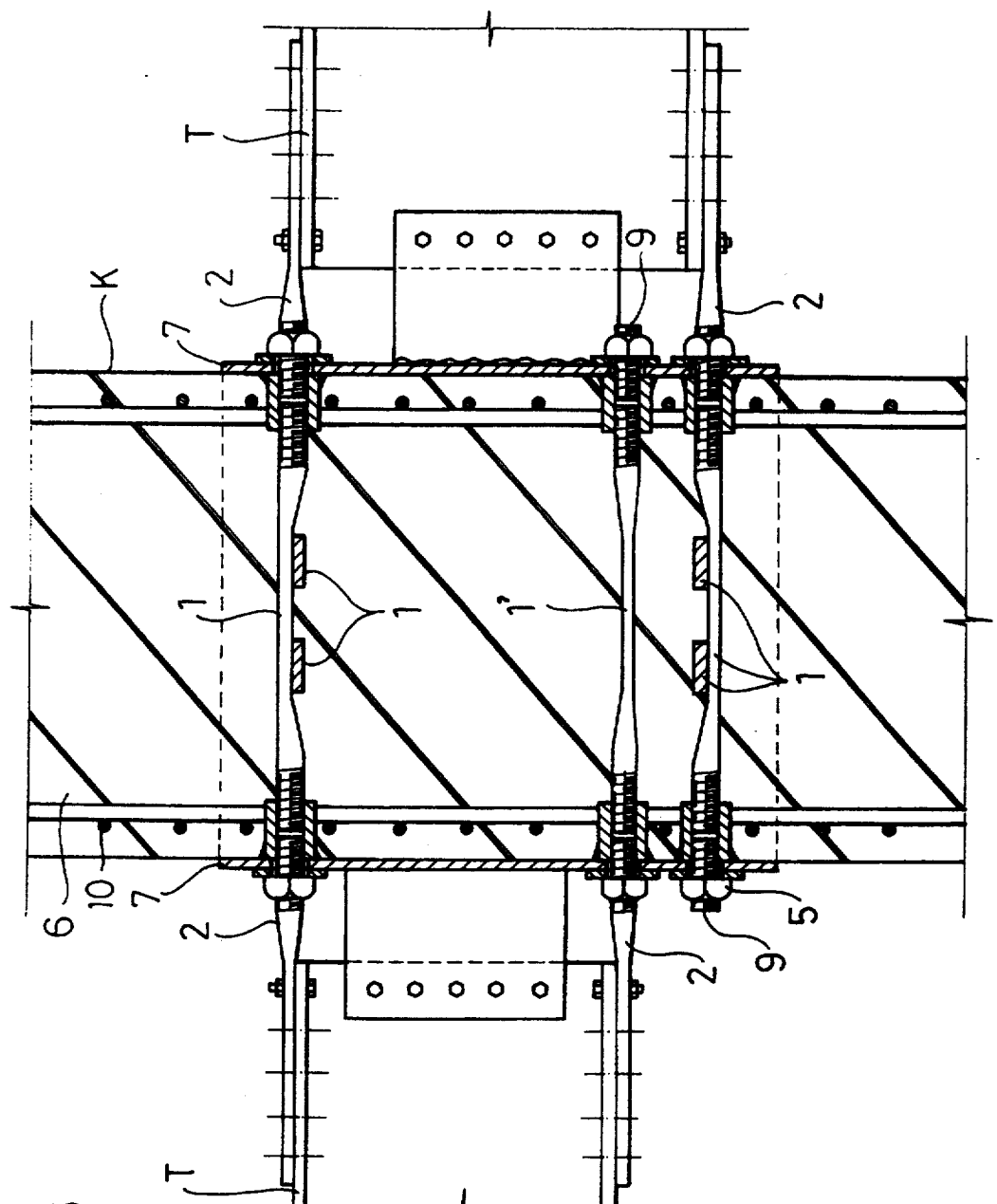
FIG. 16 is a longitudinal sectional view of FIG. 15.

FIGS. 15 and 16 show a junction in case the assemblies of the facing steel beams T, T across the column K are different.

In this case, the eccentric metal connector 1 is similar to the above-described junction as shown in FIG. 16 on the upper flange side of the steel beam T, or, in other words, at the same level at the upper edge of opposite steel beams T, T connected to the column K.

On the other hand, the necessity for the use of the eccentric metal connector 1 is determined at the level of the lower flange of the steel beams T, T. In case the assemblies of the facing steel beams T, T are different sizes and the levels of the lower flanges are different, there is no need to use the eccentric metal connector 1. Therefore in the embodiment as shown in FIG. 16, the metal connector 1 whose intermediate portion $1_2$ does not become eccentric, as shown in FIG. 6 through FIG. 8, is used for the flange of the small steel beam T assembly and the closed bolt 9 is screwed in the coupler 3 on the side of the large assembled steel beam T.

FIG. 16 shows an embodiment in case the assembly of the steel beam T on the larger assembly side in the facing steel beams T, T across the column K and that of the steel beam T in a perpendicular direction to the paper are equal to each other. The eccentric metal connectors 1, 1 are used on the lower flange of the bi-directional steel beams T, T with this larger assembly, and the closed bolt 9 is screwed in the coupler 3 on the side of the smaller steel beam T assembly.

FIGS. 17 and 18 show an embodiment in case the junction hardware 2' is a split T-type hardware composed of a web $2_3$ connected to the flange of the steel beam T by welding and a flange $2_4$ flush with the reinforced concrete construction column K, replacing the strap-shaped junction hardware 2 in the above described embodiment.

In this case, the junction hardware 2' is preliminarily installed by welding to the flange of the steel beam T and connected to the metal connector 1 by passing a bolt 12 through the flange $2_4$ in the coupler 3 and by tightening the nut 5 onto the bolt 12. The metal connector 1 is attached to each flange of the steel beam T and placed in parallel with upper and lower positions and erected, accordingly to the T-shape of the junction hardware 2', as shown in FIG. 18.

FIGS. 17 and 18 also show the arrangement in case three bi-directional pieces of the steel beams T are connected to the column K, but in this embodiment, the bolt portion $1_1$ of the metal connector 1 on the side not connected to the steel beam T as illustrated is extended and the extended portion is used for the closed bolt 9, as opposed to the embodiment shown in FIG. 1. Therefore, the coupler 3 becomes unnecessary. It may be possible to utilize this extension of the bolt portion $1_1$ and the absence of the coupler 3 on the side not connected to the steel beam T in the embodiment shown in FIG. 1 or as an alternative to the portion of the closed bolt 9 in the situation where there is a difference in the beam assembly sizes, as in the embodiment shown in FIG. 16.

Since the junction hardware 2' is not connected to the side of the extended bolt portion $1_1$ in the embodiment shown in FIGS. 17 and 18, a bearing pressure plate 11 is provided at the outside of the restriction plate 7 on the side of the extended bolt portion $1_1$ so as to uniformly load the tensile force of the metal connector 1 between the facing side surfaces of the column K.

Other arrangements are similar to those of the above-described embodiments. In case there is a difference in the beam assemblies, the junction is constructed according to the preceding embodiments.

Junction constructions between the column K and the steel beam T in the situations where the column K is a steel framed concrete construction, or a steel framed reinforced concrete construction with concrete 6 packed into the internal portion of a closed cross-section steel column $K_1$, are explained along with FIG. 19 through FIG. 30. The steel column $K_1$ in this case is a square steel pipe or a circular steel pipe.

Figure 19:
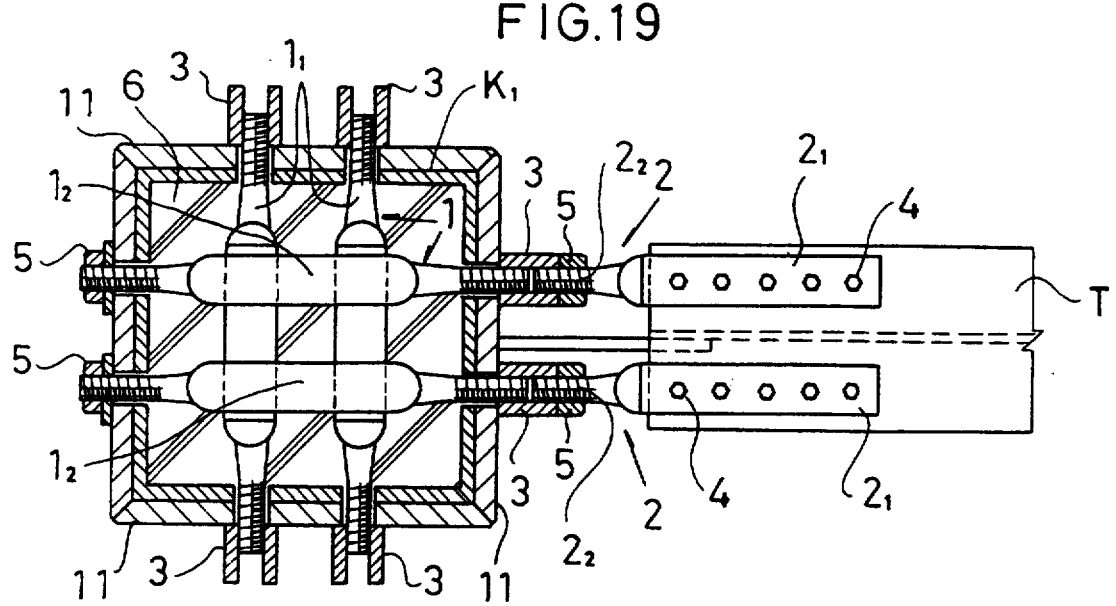
FIG. 19 is a plan view showing a junction or connecting bi-directionally three pieces of steel beams to the steel framed concrete construction column packed with concrete in the internal portion of a steel column with a closed shape in section, using a junction hardware with a strap shape.
Figure 20:
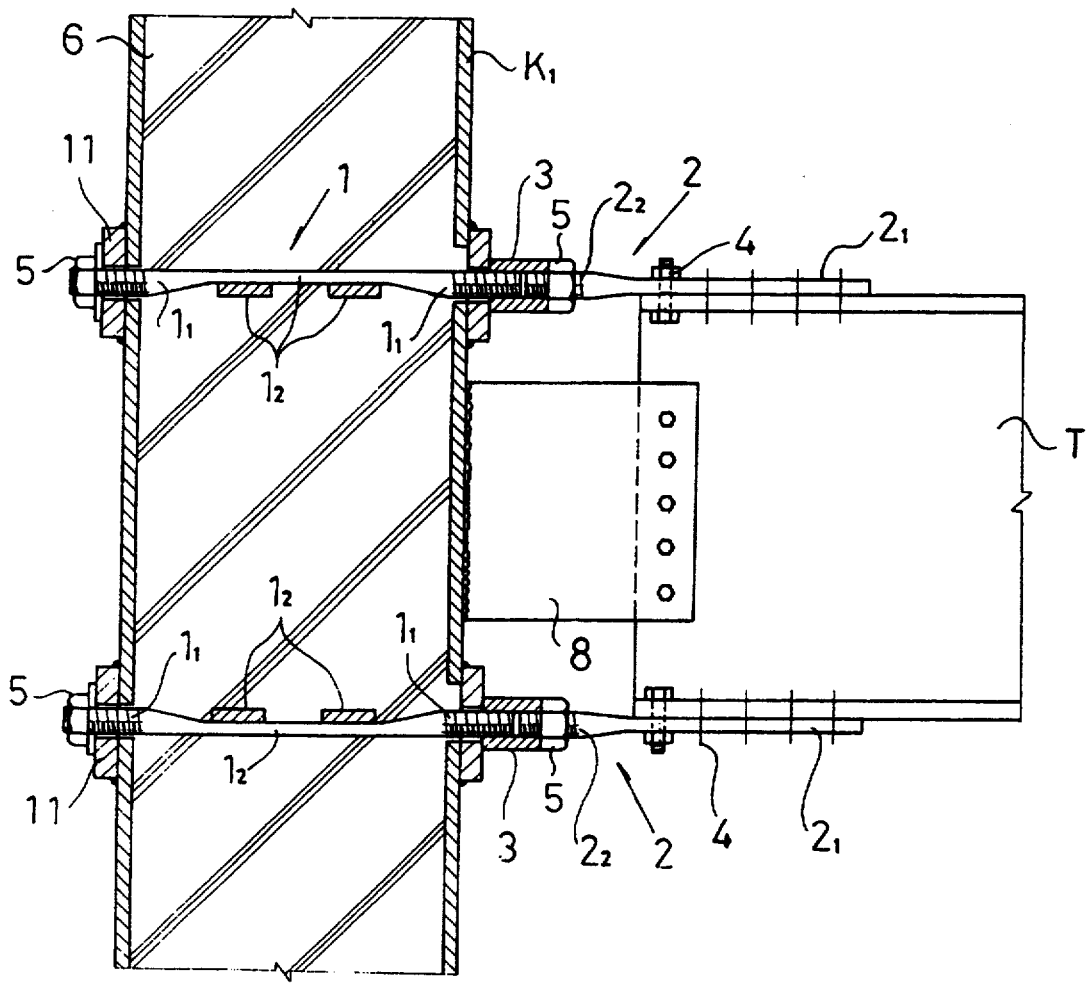
FIG. 20 is a longitudinal sectional view of FIG. 19.

In this embodiment, the steel column $K_1$ and the steel beam T to be packed with the concrete 6 in the internal portion are connected to each other using the metal connector 1 and the junction hardware 2 as shown in FIGS. 19 and 20. The flange of the steel column $K_1$ is reinforced by the bearing pressure plate 11 externally contacted on this flange, and at the same time, the transmission of the stress from the steel beam T is made by this bearing pressure plate 11 and the metal connector 1.

Figure 23:
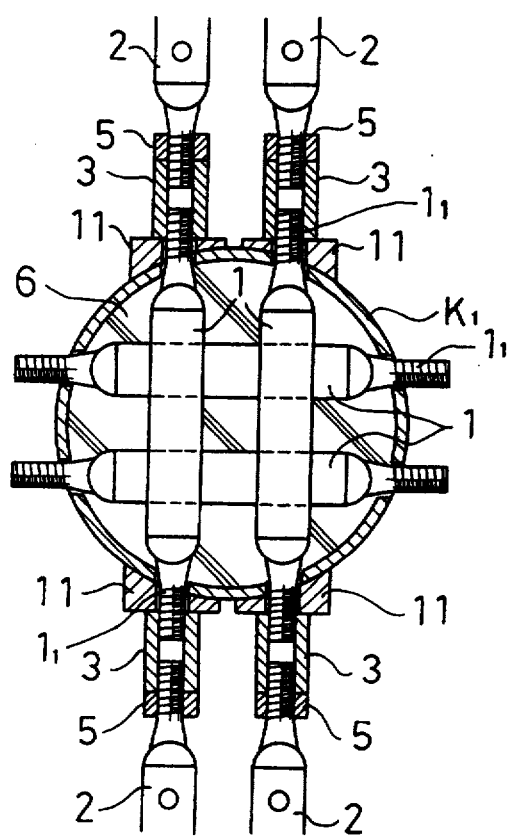
FIG. 23 is a plan view showing a junction in case four pieces of steel beams are connected bi-directionally to a steel framed concrete construction column when the steel column is circular in section.

For example, in case the steel column $K_1$ is rectangular in section, the bearing pressure plate surrounds the column in a belt as shown in FIG. 19. In case of a circular shape in cross-section, a special shape of bearing element is needed to externally contact the steel column $K_1$ and also contact the coupler 3. One example is partially provided in the bolt portion $1_1$ of the metal connector 1 as shown in FIG. 23.

As shown in FIGS. 19 and 20, in a similar manner as the embodiments described up to FIG. 18, the metal connector 1 has a length sufficient to cross between the surfaces of the bearing pressure plate 11 externally contacting on the facing flanges of the steel column $K_1$, and is composed of the bolt portions $1_1$, $1_1$ with cut male threads on both ends, the intermediate flat portion $1_2$ and the curved intermediate portion $1_2$ or the intermediate portion $1_2$ having a through hole $1_3$. In embodiment shown in FIGS. 19 and 20, the metal connector 1 whose intermediate portion $1_2$ is flat in section and whose centroid is eccentric to the axial center of the bolt portion $1_1$, as shown in FIGS. 3 through 5, is used.

Still referring to FIGS. 19 and 20, and in a similar arrangement as the embodiments shown in FIGS. 2 and 16, the metal connector 1 whose intermediate portion $1_2$ is eccentric to the bolt portion $1_1$ is used on the side where the levels of the flanges in the orthogonal steel beams T, T are same. Perpendicular metal connectors 1 are also attached to each flange of the steel beam T in an inverted mating arrangement. Furthermore, two pieces on each flange are placed side by side, corresponding to the number of the junction hardware 2 connected to the flange or the pieces of the bolt portion $2_1$.

In case the level of each flange of the orthogonal steel beams T, T is different, that is, if the perpendicular beam assembly sizes are different, no eccentric metal connector 1' shown in FIG. 6 through FIG. 8 is used for the lower flange of the steel beam T on the small assembly side. The use of the metal connector 1 or metal connector 1' in the lower flange of the steel beam T on the large assembly side is determined by the level of the lower flange of the perpendicular steel beam T.

Furthermore, one side of the facing through holes of the steel column $K_1$, through which the metal connector 1 passes has a height equal to the width of the intermediate portion $1_2$, as shown in FIG. 20.

As shown in FIGS. 19 and 20, the coupler 3 is connected to the bolt portion $1_1$ on the side connected to at least the junction hardware 2, and the junction hardware 2 is connected to this coupler 3. The bolt portion $1_1$ of the metal connector 1 on the side not connected to the junction hardware 2 is fixed to the bearing pressure plate 11 by the nut 5. The connection between the metal connector 1 and the junction hardware 2 is similar to that shown in FIG. 11, but one nut 5 is omitted since the bearing pressure plate 11 assumes the position of the nut 5 on the side of the metal connector 1.

The bearing pressure plate 11 is placed at the position of the metal connector as shown in FIGS. 19 and 20, and is preliminarily attached to the external circumference of the steel column $K_1$ by fillet welding.

The gusset plate 8 for transmitting the shearing force from the steel beam T is projected from the external circumference of the steel column $K_1$.

As above-described, the bearing pressure plate 11 surrounds the steel column $K_1$ in a band due to the ease of manufacture to fit around the rectangular steel column $K_1$.

The bolt portion $1_1$ of the metal connector 1 on the side connected to the junction hardware 2 passes through the bearing pressure plate 11 and is projected from the surface of the bearing pressure plate, and the coupler 3 contacts the bearing pressure plate 11 after screwing the coupler 3 onto the projected portion to fix the metal connector 1 to the steel column $K_1$.

Since the bearing pressure plate 11 circumscribes the steel column $K_1$ within more or less width, it plays a role in stiffening the flange and at the same time in transmitting either the compressive force from the junction hardware 2 connected to the metal connector 1 to the concrete 6 in the steel column $K_1$ directly or the tensile force to it as a bearing pressure from the opposite side through the metal connector 1.

FIGS. 19 and 20 show an embodiment in case of using junction hardware 2 with a strap shape.

As above-mentioned, this junction hardware 2 is composed of the flat plate portion $2_1$ having a plurality of bolt holes and the bolt portion $2_2$ with a cut male thread and with an axis in parallel with the plane of the plate portion $2_1$, and it is connected to the metal connector 1 by screwing the bolt portion $2_2$ into the coupler 3 as illustrated in the drawing.

FIGS. 19 and 20 also show a junction in case three pieces of steel beams T are connected bi-directionally when the steel column $K_1$ is a side column. As above-mentioned, the bolt portion $1_1$ of the metal connector 1 on the side not connected to the steel beam T is fixed to the bearing pressure plate 11 with the nut 5, and therefore, it has a structure for ensuring the transmission of the tensile force from the steel beam T in the direction of the concrete 6.

The tightening of the nut 5 is done after the packing and the subsequent hardening of the concrete 6 for loading the reaction of the tensile force from the metal connector 1. In order to improve efficiency of field work, the packing of the concrete 6 may be done in factories preliminarily.

After the concrete 6 is packed while the metal connectors 1, 1 and the bearing pressure plate 11 are temporarily fixed by providing the metal connector 1 and the bearing pressure plate 11 in the steel column $K_1$ and screwing the coupler 3 and the nut 5 in the bolt portions $1_1$, $1_1$ of the metal connector 1, the coupler 3 is firmly connected to the bearing pressure plate 11 so as to give a necessary tension to the metal connector 1 after the hardening of the concrete 6. Thereafter, the junction is completed by connecting the junction hardware 2 to the metal connector 1, setting the steel beam T plumb between the upper and lower junction hardware 2, 2 and connecting by tightening the bolt 4. Then, the execution is completed by tightening the nut 5 attached to the bolt portion $2_1$ on the junction hardware 2.

Figure 21:
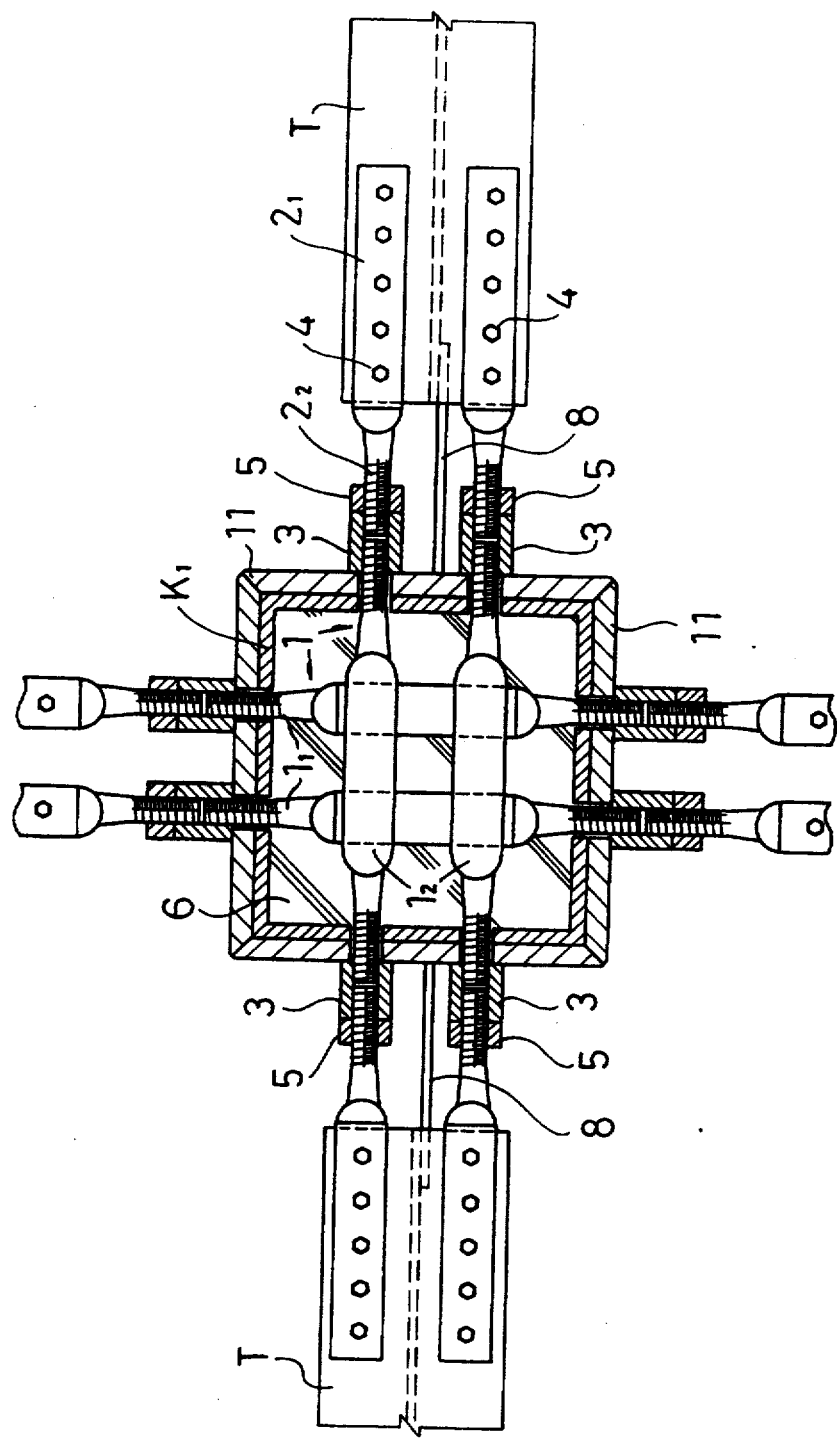
FIG. 21 is a plan view showing a junction in case four pieces of steel beams are connected bi-directionally to a steel framed concrete construction column and the assemblies of the facing steel beams are mutually different.
Figure 22:
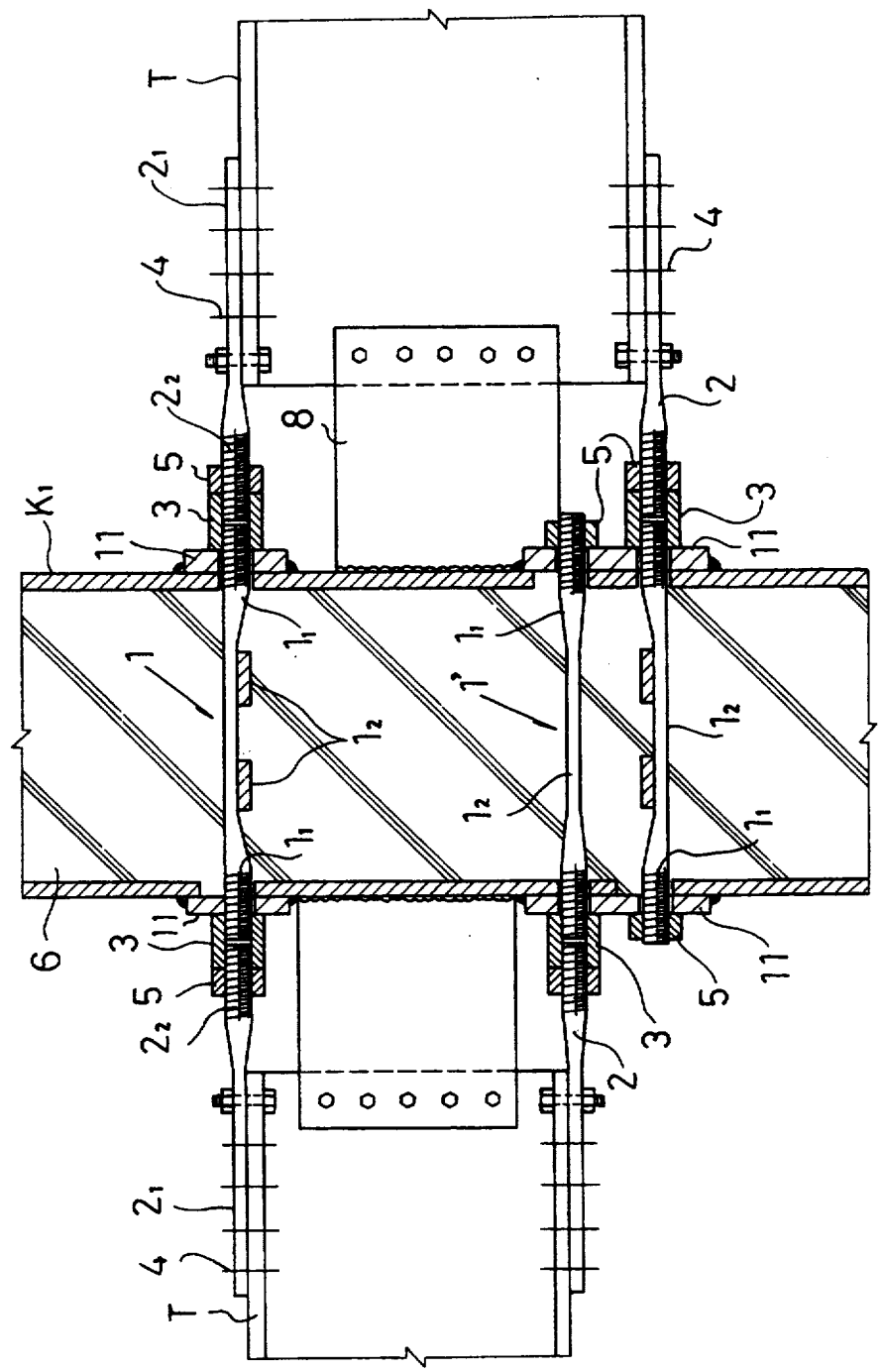
FIG. 22 is a longitudinal sectional view of FIG. 21.

FIGS. 21 and 22 show an embodiment in case one assembly of facing steel beams T, T is different from that of the other steel beam T.

Similar to the embodiment described above, the eccentric metal connector 1 is used on the side of the upper flange of the steel beams T, T. The use of the eccentric metal connector 1 on the side of the lower flange is, however, needed only in case the levels of the lower flanges of the orthogonal steel beams T, T are the same, as was described for the case when the column K has a reinforced concrete construction. Therefore, there is no need to use the eccentric metal connector 1 for the lower flanges of the steel beams T, T facing to each other, as seen in FIG. 22, and as a result, the metal connector 1' whose intermediate portion $1_2$ is not eccentric is used for the steel beams T, T on the side of small assembly. The bolt portion $1_1$ not connected to the junction hardware 2 is fixed to the bearing pressure plate 11 by the nut 5 as above-mentioned.

The embodiment shown in FIG. 22 includes the assembly of the steel beam T on the larger assembly side facing across the steel column $K_1$ equal to that of the steel beam T in the perpendicular direction, and thus the eccentric metal connectors 1, 1 are used on the side of the lower flange of the bi-directional steel beams T, T on this larger assembly side.

FIG. 23 shows an embodiment in case the steel column $K_1$ is circular in section.

In this case, the surface of the bearing pressure plate 11 on the side of the steel column K1 has a corresponding curvature, and the surface on the side of the steel beam T is flat. The other arrangements are similar to those in the embodiment shown in FIGS. 19 and 21. The bearing pressure plate 11 may completely surround the periphery of the steel column $K_1$, but is shown independently in the bolt portion $1_1$ of each metal connector 1, as above-described, due to the saving of the steel material and manufacturing equipment.

Figure 24:
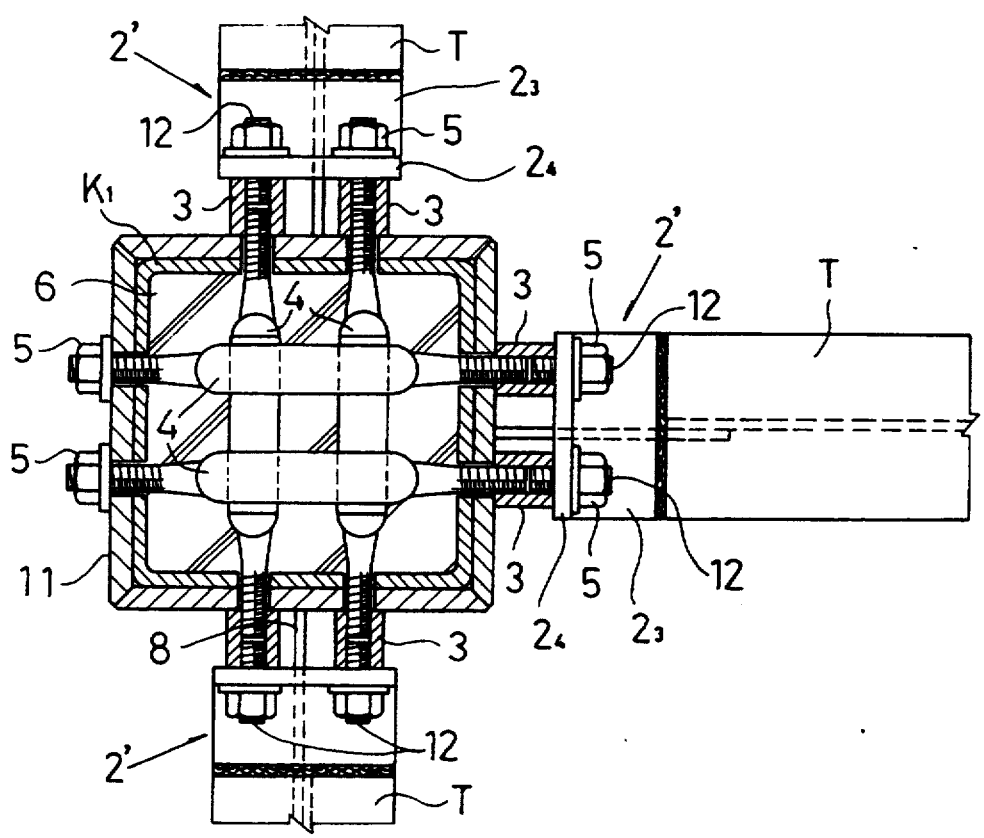
FIG. 24 is a plan view showing a junction in case the junction hardware of a split T-type hardware is used for a steel framed concrete construction column packed with concrete in the internal portion of a steel column with a closed shape in section.
Figure 25:
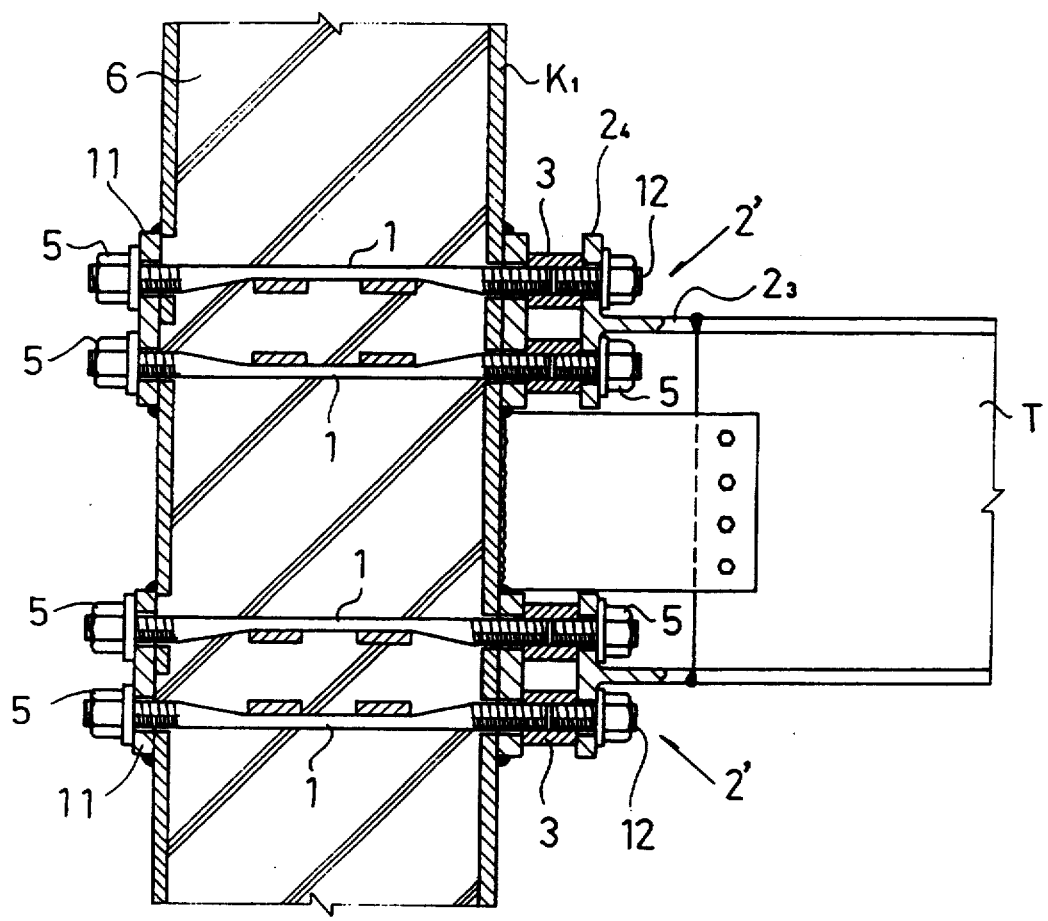
FIG. 25 is a longitudinal sectional view of FIG. 24.

FIGS. 24 and 25 show an embodiment using a split T-type hardware composed of both of a web $2_3$ welded and connected to the flange of the steel beam T and a flange $2_4$ connected to the metal connector 1 perpendicular to the web for the junction hardware 2'.

The junction hardware 2' of this type is preliminarily connected to the flange of the steel beam T by welding, and it is connected to the metal connector 1 by passing a bolt 12 through the flange $2_4$ into the coupler 3 and then tightening the nut 5 against this. In this case, the metal connector 1 is also attached to each flange of the steel beam T in response to the shape of the junction hardware 2' as shown in FIG. 25 and provided in parallel at upper and lower positions. This embodiment shows an arrangement where three pieces of steel beams T are connected bi-directionally, similar to the embodiment of FIG. 19, and the bolt portion $1_1$ of each metal connector 1 on the side not connected to the steel beam T is fixed to the bearing pressure plate 11 by the nut 5 likewise.

The other arrangements are similar to the preceding embodiments, and in case there are differences in the beam assemblies, they are constructed in accordance with the junction of FIGS. 21 and 22.

An embodiment using the metal connector 1 having a through hole $1_3$ at the intermediate portion $1_2$ is explained along with FIG. 26 through FIG. 30. Concrete 6 is packed in the internal portion of the closed cross-section steel column $K_1$ similar to those shown in FIG. 19 through FIG. 25, and the metal connector 1 having the through hole $1_3$ may also be used with the column K having a reinforced concrete construction as shown in FIG. 1 through FIG. 18.

The metal connector 1 having the through hole $1_3$ is provided in one direction across the column K, and a metal connector 1'' with a steel rod shape is used in the orthogonal direction.

The metal connectors 1, 1'' have a length sufficient to cross the bearing pressure plate 11 surrounding the steel column $K_1$, and the bolt portions $1_1$, $1_1$ are formed at both edges thereof. These are same as embodiments where the metal connector 1 has an intermediate portion $1_2$ with an eccentric shape.

Figure 26:
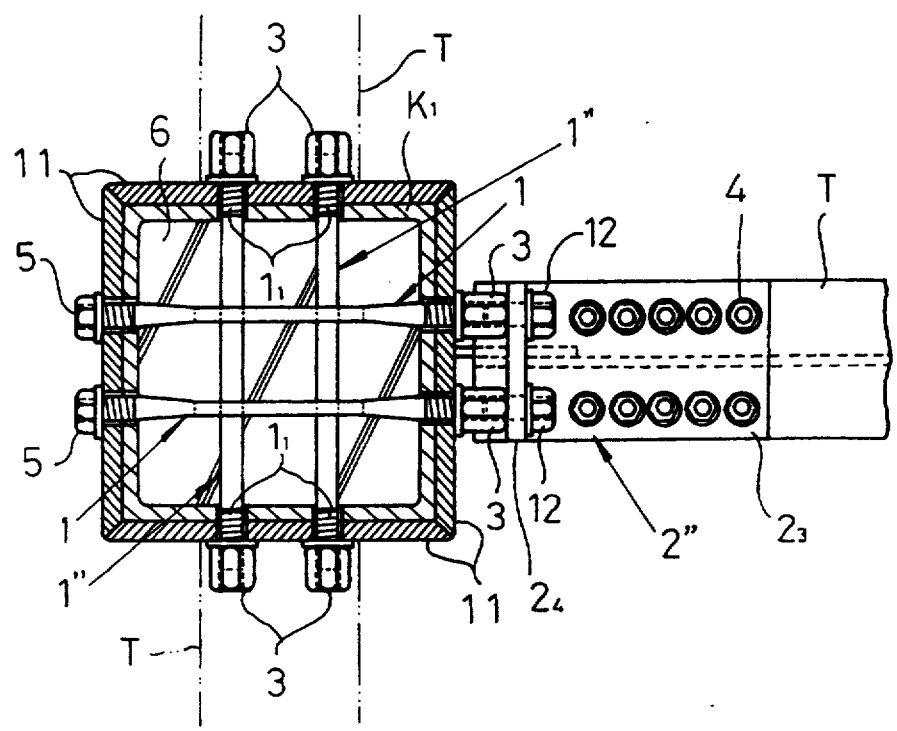
FIG. 26 is a plan view showing a junction for connecting the steel beams to a steel framed concrete construction column using metal connectors having through holes at the intermediate portion and junction hardware with a L-shape in section.
Figure 27:
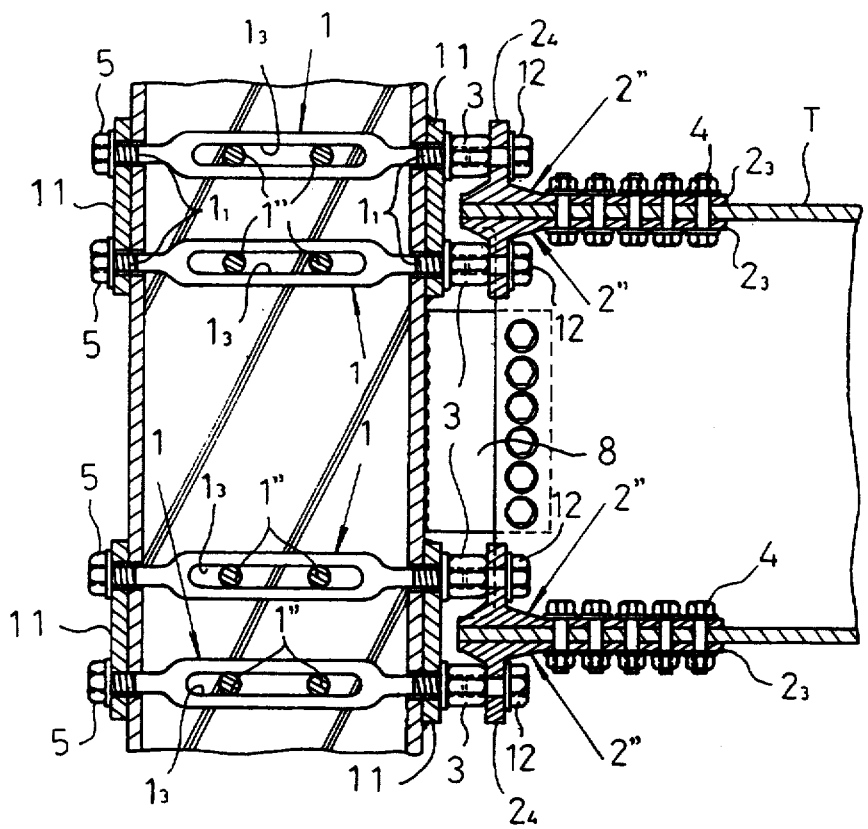
FIG. 27 is a longitudinal sectional view of FIG. 26.

The intermediate portion $1_2$, of the metal connector 1 is flat in cross-section and an axially elongate through hole $1_3$ is bored through the thin dimension, as shown in FIGS. 26 and 27. Any through holes $1_3$ will suffice if the metal connector 1'' can be passed through. Thus, there is no problem with the hole shape.

The metal connector 1'' crossing the metal connector 1 is passed through this through hole $1_3$ and erected between the flanges of the steel column $K_1$. The bolt portion $1_1$ thereof and the bolt portion $1_1$ of the metal connector 1 are positioned at the same level with each other.

The techniques to fix the metal connectors 1 and 1" and to connect them to the junction hardware 2 are exactly same as those in the case of the metal connector 1 having the eccentric intermediate portion $1_2$.

The embodiments given in FIGS. 26 through FIG. 30 show the junctions using the junction hardware 2", 2" with an L shape in cross-section which is analogous to the split T-type hardware making two pieces into a pair.

Figure 28:
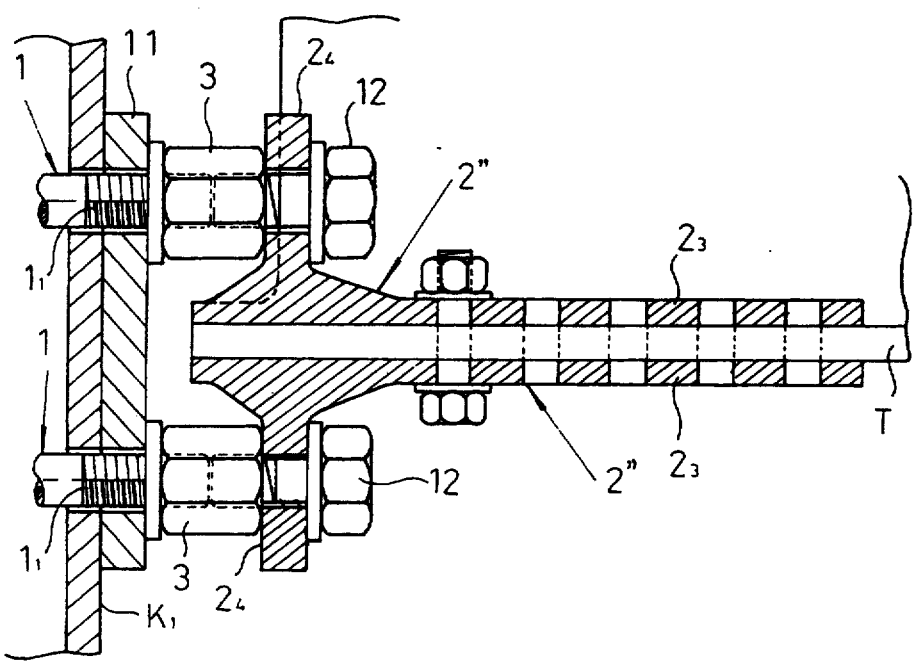
FIG. 28 is an enlarged-scale view in part of FIG. 27.

The L-shape junction hardware 2' has the complex form of the strap-shape junction hardware 2 and the junction hardware 2' of a split T-type hardware as shown in FIGS. 27 and 28, and it forms an L-shape in section by being composed of both the web $2_3$ overlapped on the flanges of the steel beam T and corresponding to the flat plate portion $2_1$ of the strap-shape junction hardware 2, and the flanges $2_4$ corresponding to the flanges $2_4$ of the split T-type hardware and perpendicular to the web.

The junction hardware 2" and 2" are symmetrical above and below and provided as if each flange of the steel beam B is held between them. These junction hardware 2" and 2" are connected to the flanges of the steel beam T by bolts 4, in a similar manner to the strap-shape junction hardware 2, and also connected to the metal connector 1 by the bolt 12, passing through the flange $2_4$ and the coupler 3 in a similar manner to the junction hardware 2' of the split T-type hardware.

Figure 29:
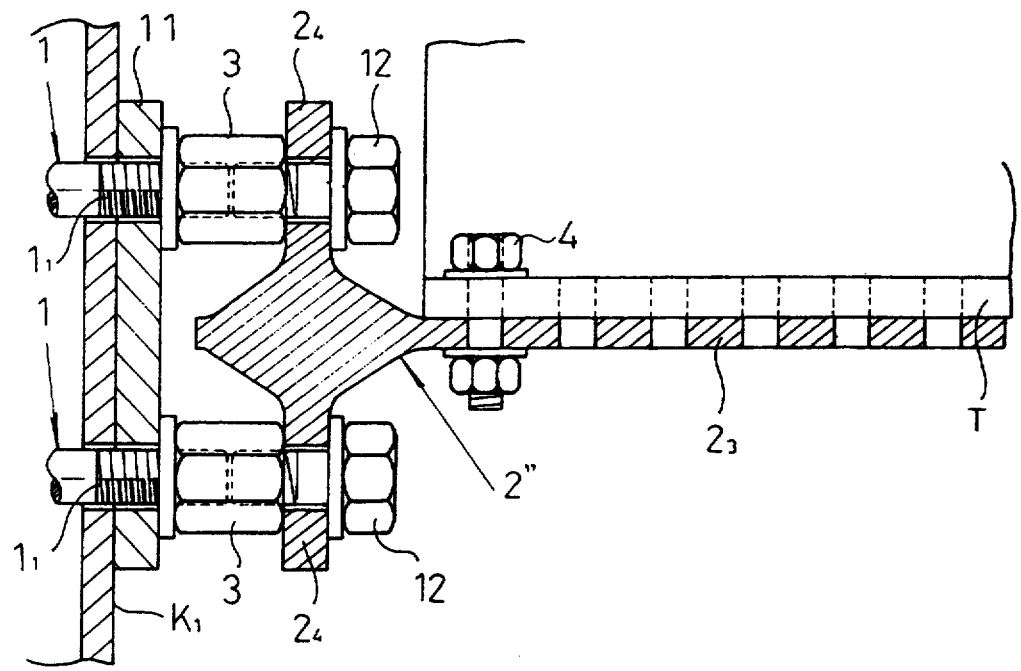
FIG. 29 is an enlarged-scale sectional view showing a lower flange part in the steel beam in case of using a junction hardware with a T-shape in section for making two pieces of junction hardware in FIG. 26 integral.

The junction hardware 2" shown in FIG. 29 projects the flanges $2_4$ and $2_4$ from both surfaces of the web $2_3$ of the L-shape junction hardware 2" shown in FIG. 28 to give a T-shape in section, and this junction hardware 2" is connected to one surface of the flange of the steel beam T by bolts 4.

Figure 30:
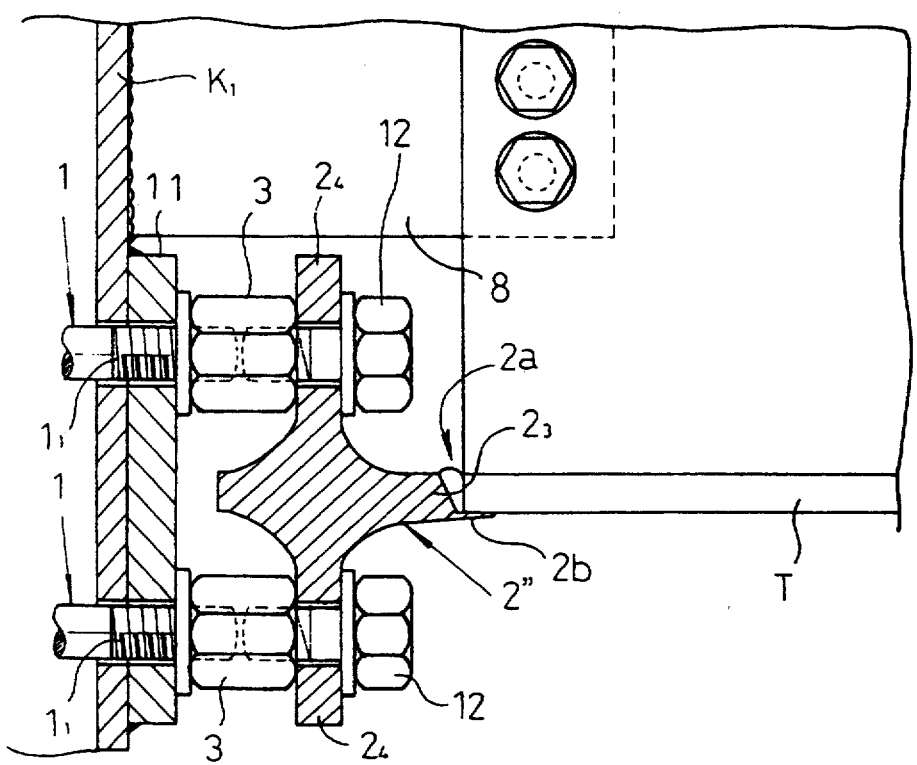
FIG. 30 is an enlarged-scale sectional view in case of using a junction hardware with a T-shape in section similar to a split T-type hardware.

The junction hardware 2" shown in FIG. 30 is obtained by shrinking the web $2_3$ of the junction hardware 2" shown in FIG. 29, and corresponds to a modification of the junction hardware 2' of the split T-type hardware in the manner of the connection to the steel beam T.

This junction hardware 2" is connected by butting the web $2_3$ against the flanges of the steel beam T and welding in a similar manner as the junction hardware 2" of the split T-type hardware. In the illustrated embodiment, a backing strap $2b$ is protruded from the back surface side of the groove $2a$ of the web $2_3$ in the junction hardware 2", and the operational efficiency of the weld is improved.

The junction hardware 2" is connected to the edge portion of the flange of the steel beam T and the groove $2a$ by welding with a deposited metal in a similar manner as the junction hardware 2' of the split T-type hardware. However, while the generation of a residual stress to the welded portion is avoided by inclining the backing strap $2b$ to the opposite side of the groove $2a$ with a prospect of the shrinkage deformation at the cooling time of the deposited metal, the backing strap $2b$ can be adhered to the flange of the steel beam T.

Examples of metal connectors 1 curved at the intermediate portion $1_2$ thereof will be explained along with FIG. 31 through FIG. 42. The embodiments that will be shown in FIG. 31 through FIG. 42 are different from those described above and shown in the case where each steel column $K_1$ has an opened shape in section. This steel column $K_1$ may be a steel framed construction column K by itself, but also a steel framed concrete construction column or a steel framed reinforced concrete construction column by surrounding the circumference thereof with the concrete 6 as shown in dashed line.

The metal connector 1 shown herein is exactly same as the metal connectors described above excluding the fact that the intermediate portion $1_2$ is curved. This metal connector 1 is applicable to the reinforced concrete construction columns K shown in FIG. 1 through FIG. 18 or the steel concrete construction columns K shown in FIG. 19 through FIG. 30.

Figure 34:
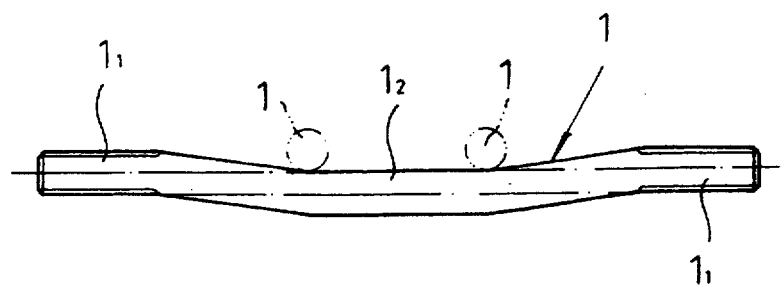
FIG. 34 is an elevation view showing a manufacturing example of a metal connector of a type curved at the intermediate portion.
Figure 35:
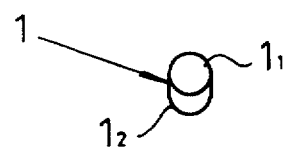
FIG. 35 is a side view of FIG. 34.

The intermediate portion $1_2$ of this curved metal connector 1 spans the bolt portions $1_1$ at both ends, as shown in FIG. 34. Perpendicular connectors have their curved portions $1_2$ eccentric to the axes of the bolt portions 1, in the positions shown in FIG. 34, similar to the metal connector 1 having the intermediate portion $1_2$ with a flat shape used in the junctions shown in FIGS. 1 and 2.

Figure 31:
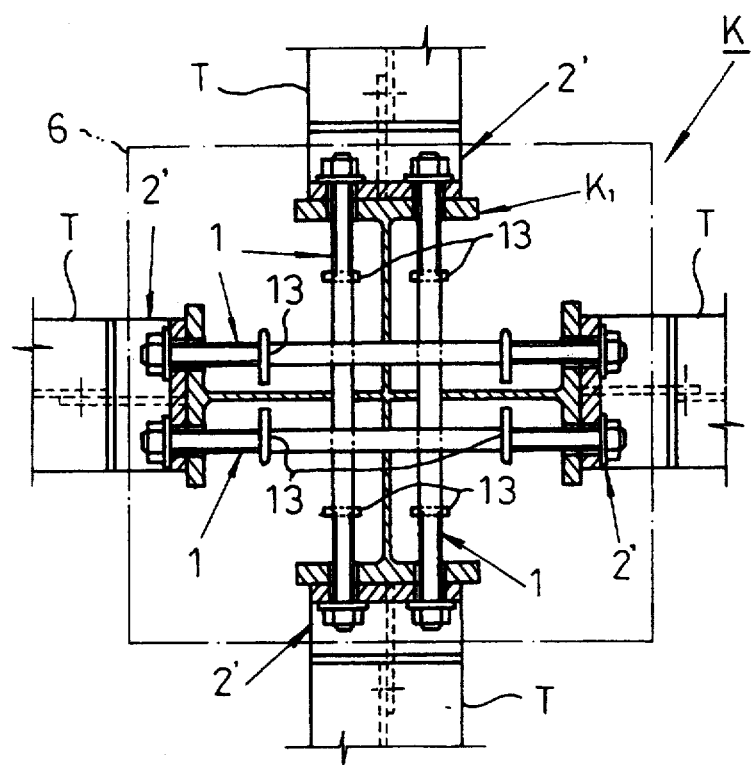
FIG. 31 is a plan view showing a junction for connecting the steel beams to the steel column with an opened shape in section using the metal connectors curved at the intermediate portion and the junction hardware of a split T-type hardware.
Figure 32:
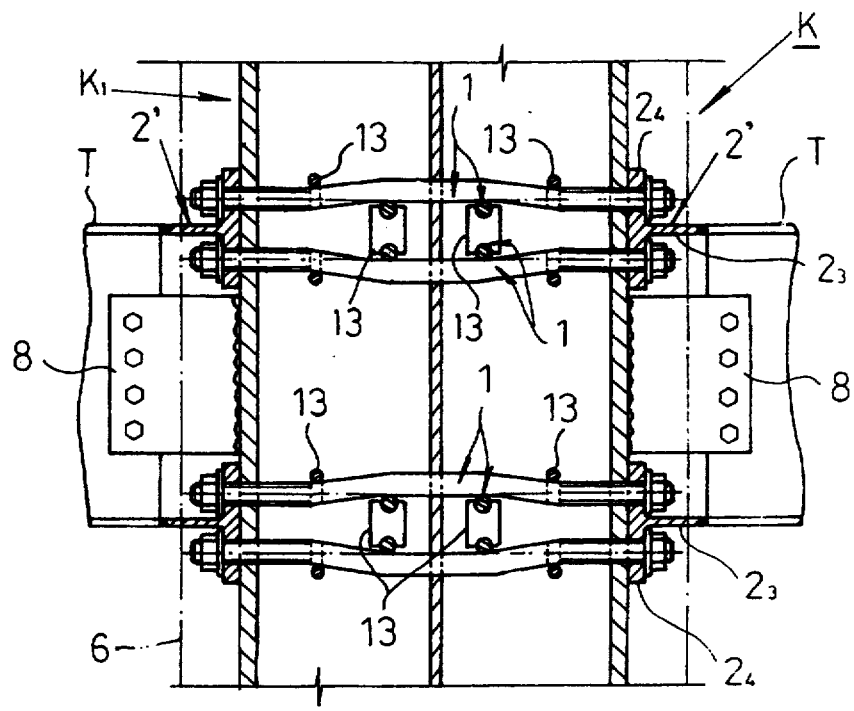
FIG. 32 is a longitudinal sectional view of FIG. 31.
Figure 33:
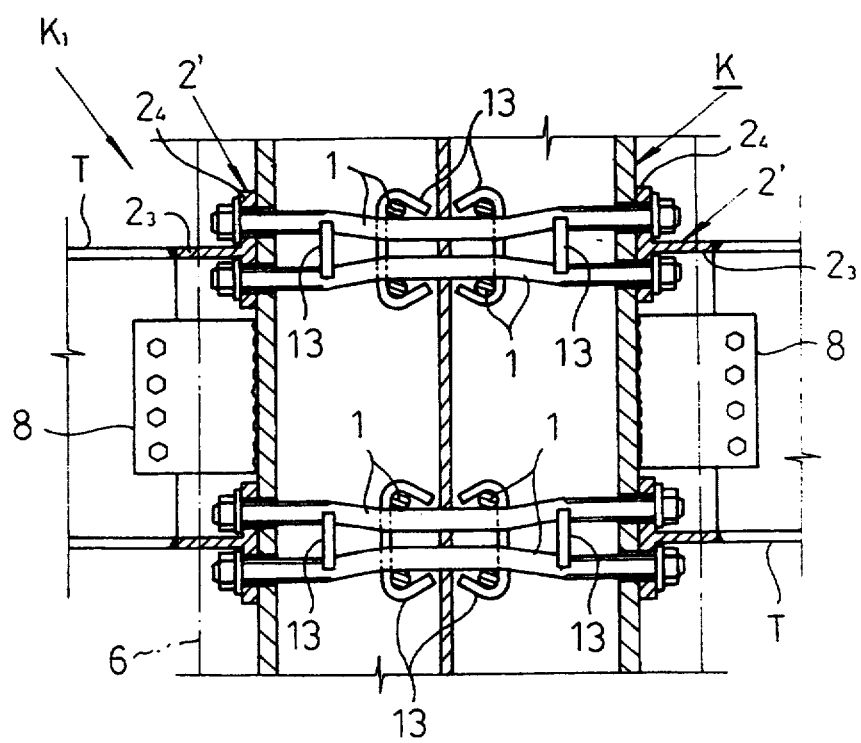
FIG. 33 is a longitudinal sectional view of an orthogonal direction to FIG. 32.
Figure 36:
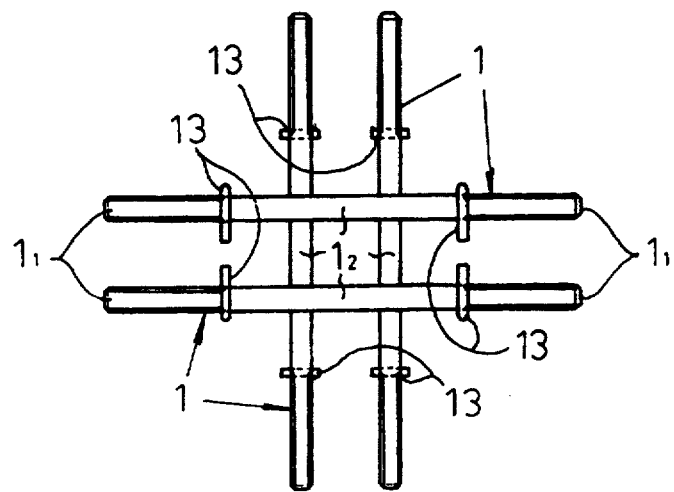
FIG. 36 is a plan view showing an arrangement condition in the junction of the metal connector shown in FIG. 34.

These metal connectors 1, 1 cross each other in an inverted mating arrangement as shown in FIGS. 32 and 33, which are bi-directional elevations of FIG. 31 and thus the bolt portions $1_1$, $1_1$ of both metal connectors 1, 1 are provided at the same level, in a similar manner as the embodiment in FIGS. 1 and 2. FIG. 36 shows an arrangement condition of only the orthogonal metal connectors 1, 1, and FIG. 37 and FIG. 38 show their bi-directional elevations, respectively.

In this metal connector 1, as the axial direction of the bolt portion $1_1$ and that of the inclined portion adjacent the intermediate portion $1_2$ are different, the resultant of bi-directional axial forces is applied to the curved places under a tensile load, and the curved portion is deformed in the direction of the resultant and tends to return to a straight line. The deformation is, however, prevented by the restriction member 13 provided at each curved portion as shown in FIGS. 32 and 33.

Figure 37:
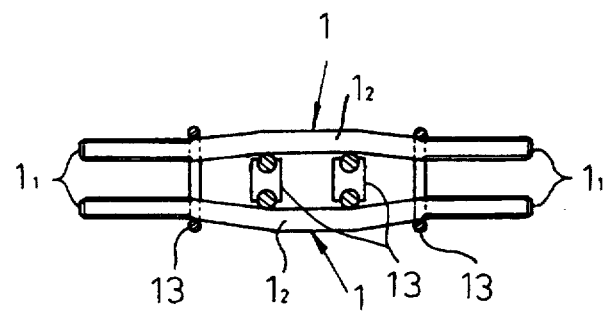
FIG. 37 is an elevation view of FIG. 36.

A downward resultant is applied on the curved places of the intermediate portion $1_2$ shown as the elevations in FIGS. 32 and 37, that is, the metal connector 1 on the upper side, and a deformation thereof is restricted by providing the restriction member 13 as a spacer for keeping the distance between the metal connectors 1, 1 placed in parallel with each other at upper and lower positions as shown in FIGS. 32, 33, 37 and 38. Likewise, an upward resultant is applied on the curved portion of the metal connector 1 on the downside and resisted by the restriction member 13.

Figure 38:
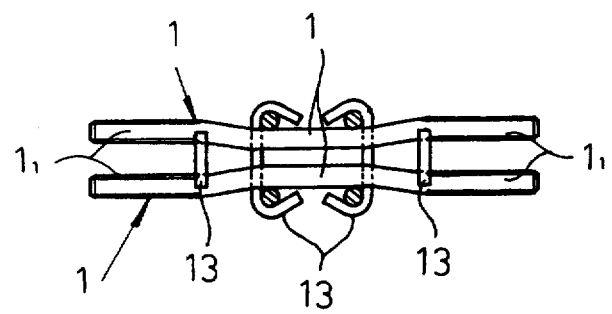
FIG. 38 is an elevation view in an orthogonal direction to FIG. 37.

Conversely, an upward resultant is applied on the curved places of the intermediate portion $1_2$ shown as the elevations in FIGS. 33 and 38, that is, the metal connector 1 on the upper side, and a deformation thereof is restricted by providing the restriction member 13 as a clamp shape in the applied direction of the resultant so as to hold the metal connectors 1, 1 placed in parallel with each other at the upper and lower positions. Likewise, a downward resultant is applied on the curved portion of the metal connector 1 on the downside and resisted by the restriction member 13.

The steel column K shown in FIG. 31 through FIG. 33 has an open cross-section and the thicknesses of the flanges are larger than closed cross-section columns, and thus the flanges are strong against an out-of-plane deformation. Therefore, there is no bearing pressure plate 11 as in Figs. 24 and 25 when using the junction hardware 2' of the same split T-type hardware, and the bolt portion $1_1$ of the metal connector 1 is passed directly through the flanges $2_4$ of the junction hardware 2' and firmly connected thereto.

In the embodiment shown in FIG. 31 through FIG. 33, the junction hardware 2" shows only the case of the split T-type hardware, such junction hardware 2 having the flanges 2₄ with T-shape and L-shape in section are used likewise. The junction hardware 2 with a strap-shape can be used by connecting through the coupler 3 shown in FIGS. 19 and 20.

Figure 39:
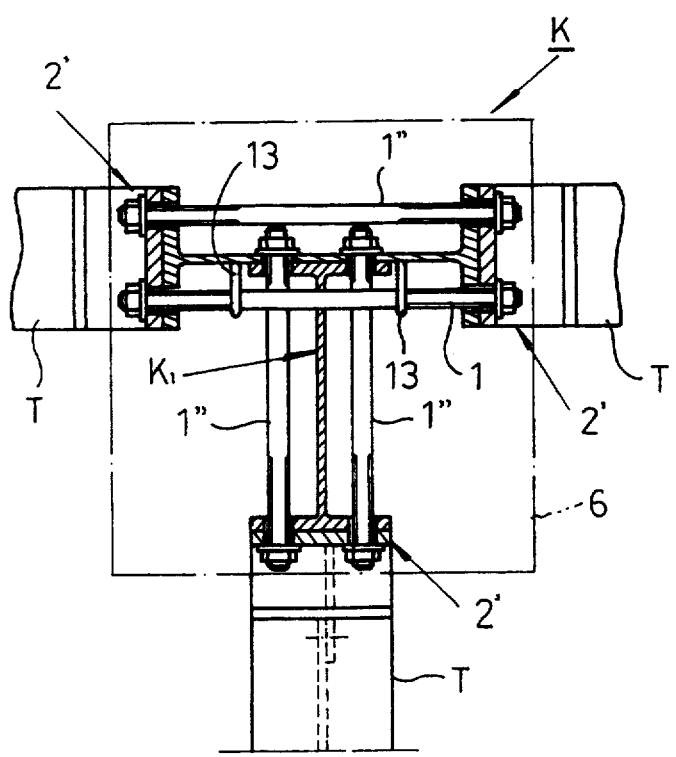
FIG. 39 is a plan view showing a junction for connecting three pieces of steel beams to the steel column with a T-shape in section using the metal connectors curved at the intermediate portion.
Figure 40:
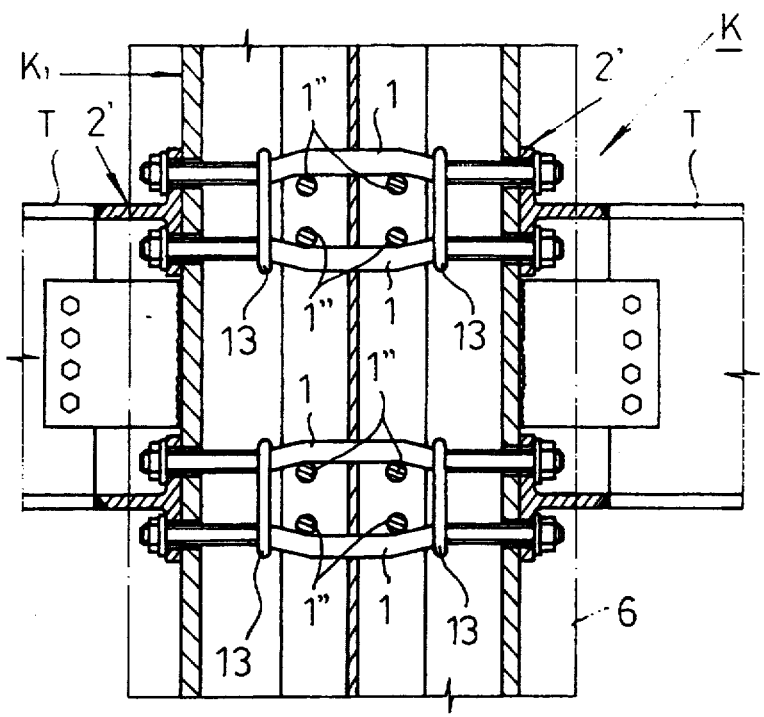
FIG. 40 is a longitudinal sectional view of FIG. 39.
Figure 41:
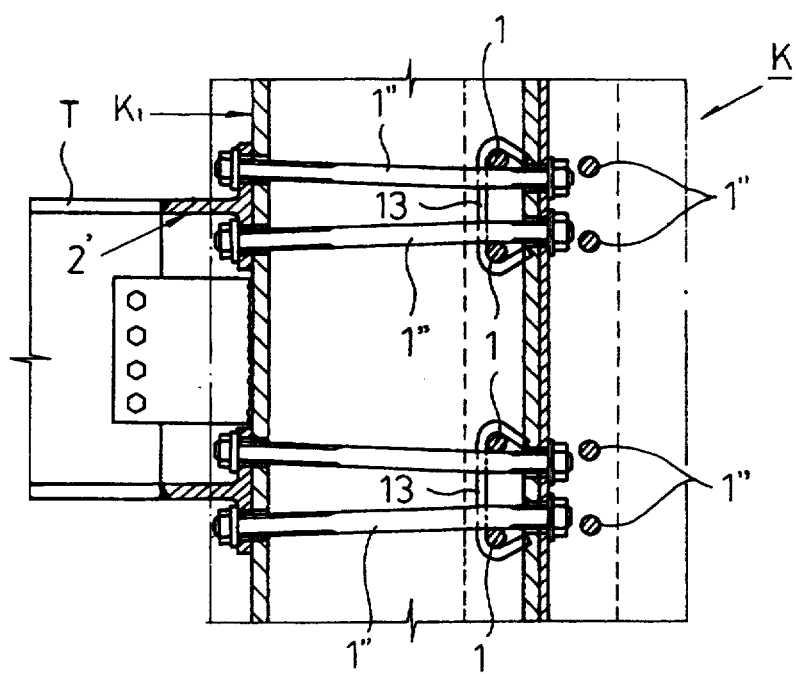
FIG. 41 is a longitudinal sectional view in an orthogonal direction to FIG. 40.

FIG. 39 through FIG. 41 show an embodiment wherein the cross section of the steel column $K_1$ has a T-shape and the column K is a side column. In this embodiment, a couple of H-shape steel columns are combined, and the flanges of one H-shape steel is butted against the web of the other H-shape steel to form the steel column $K_1$ with a T-shape in section.

In this case, the metal connectors 1 have intermediate portions $1_2$ which are curved, and lie in the directions where the steel beams T, T face to hold together the steel column $K_1$ as shown in FIG. 40. In the embodiment, the metal connector 1" in the form of straight line is inclined vertically to cross with the curved metal connector 1 which is in a horizontal plane as shown in FIG. 41.

As a result, the curved metal connector 1 extending along the direction of the collinear steel beams T, T is provided so as to cross the straight metal connector 1" above and below, as shown in FIG. 40. Therefore, the metal connectors 1, 1 above and below the metal connector 1" are prevented from deformation by the clamp-shaped restriction member 13.

Figure 42:
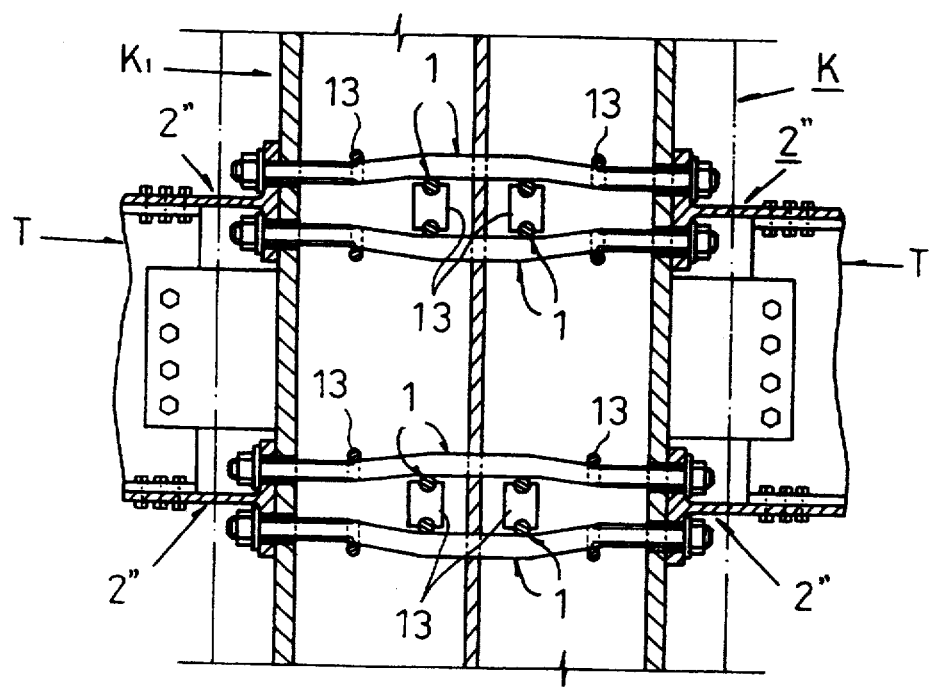
FIG. 42 is a longitudinal sectional view showing a junction using the metal connectors curved at the intermediate portion and the junction hardware with a split T-type hardware shape similar to the junction hardware shown in FIG. 29.

FIG. 42 shows a junction using the junction hardware 2" connected to the steel beam T by tightening the bolt, in a similar shape as that of the T-shape junction hardware 2" shown in FIG. 29, and also connected to the bolt portion $1_1$ of the metal connector 1 while contacting the steel column $K_1$.

Referring now to FIG. 43 through FIG. 51, one embodiment of the present invention of the junction structure between a steel column shown as a steel member T and a concrete base shown as a reinforced concrete member K will be explained. A steel framed concrete construction column or a steel framed reinforced concrete construction column is constructed by either rolling concrete 6 around the circumference of an open cross-section steel column or charging the concrete 6 in the internal portion of a closed cross-section steel column. The steel column and the concrete base will be shown as $T_1$ and K from FIG. 43 to FIG. 51.

Figure 43:
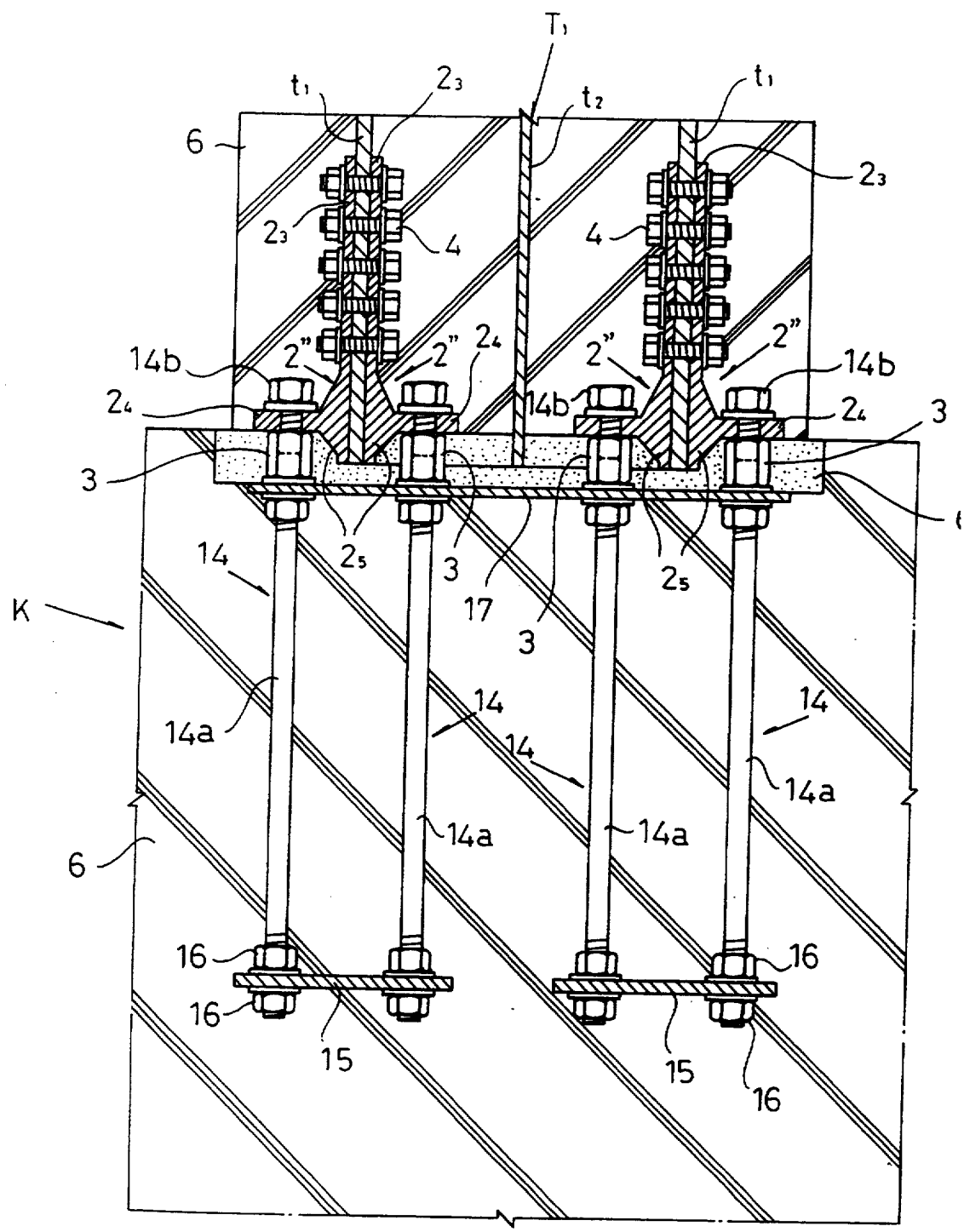
FIG. 43 is a longitudinal sectional view showing a junction of the column base for rigidly connecting the column base of the steel column with an opened shape in section as a steel member to the concrete base as a structural member in a reinforced concrete construction using junction hardware of a bolt connection type shown in FIG. 27 and anchor bolts corresponding to the metal connectors.

As shown in FIG. 43, the present invention rigidly connects the column base in the steel column $T_1$ to the concrete base K through the junction hardware 2" connected to a flange $t_1$ of the column base and the concrete base K by the anchor bolt 14. The anchor bolt 14 corresponds to the metal connector 1 in the column and beam junction and the junction hardware 2" used for the column and beam junction in FIG. 26 through FIG. 30. The shearing force is transmitted from the column base to the concrete base K by means of the shear key $2_5$ protruded on the side of the concrete base K of the junction hardware 2".

Figure 44:
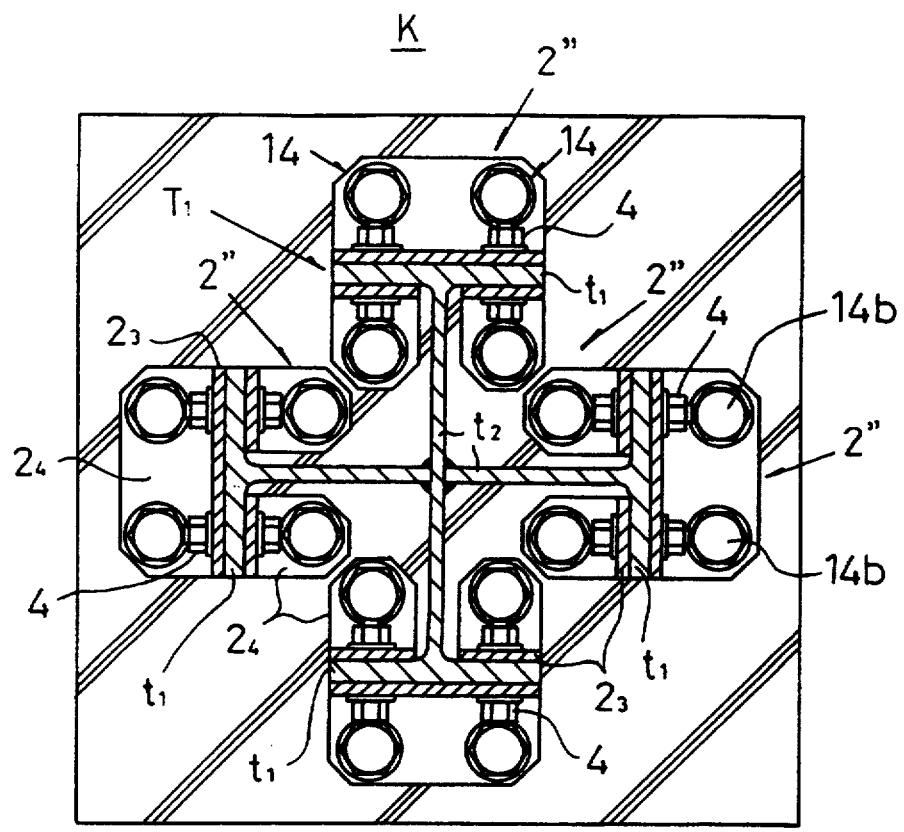
FIG. 44 is a plan view of FIG. 43.
Figure 45:
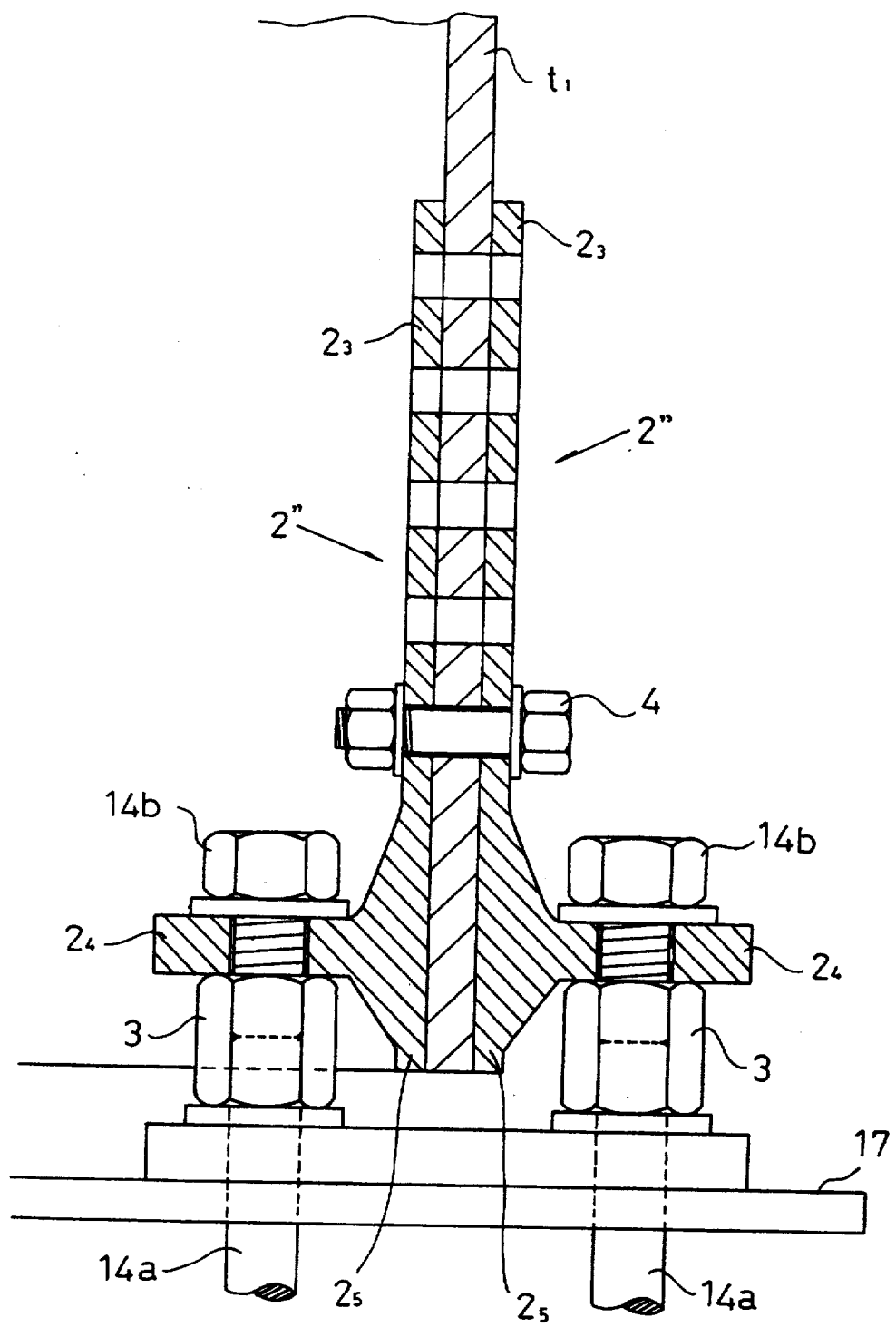
FIG. 45 is a partially enlarged-scale view of FIG. 43.
Figure 46:
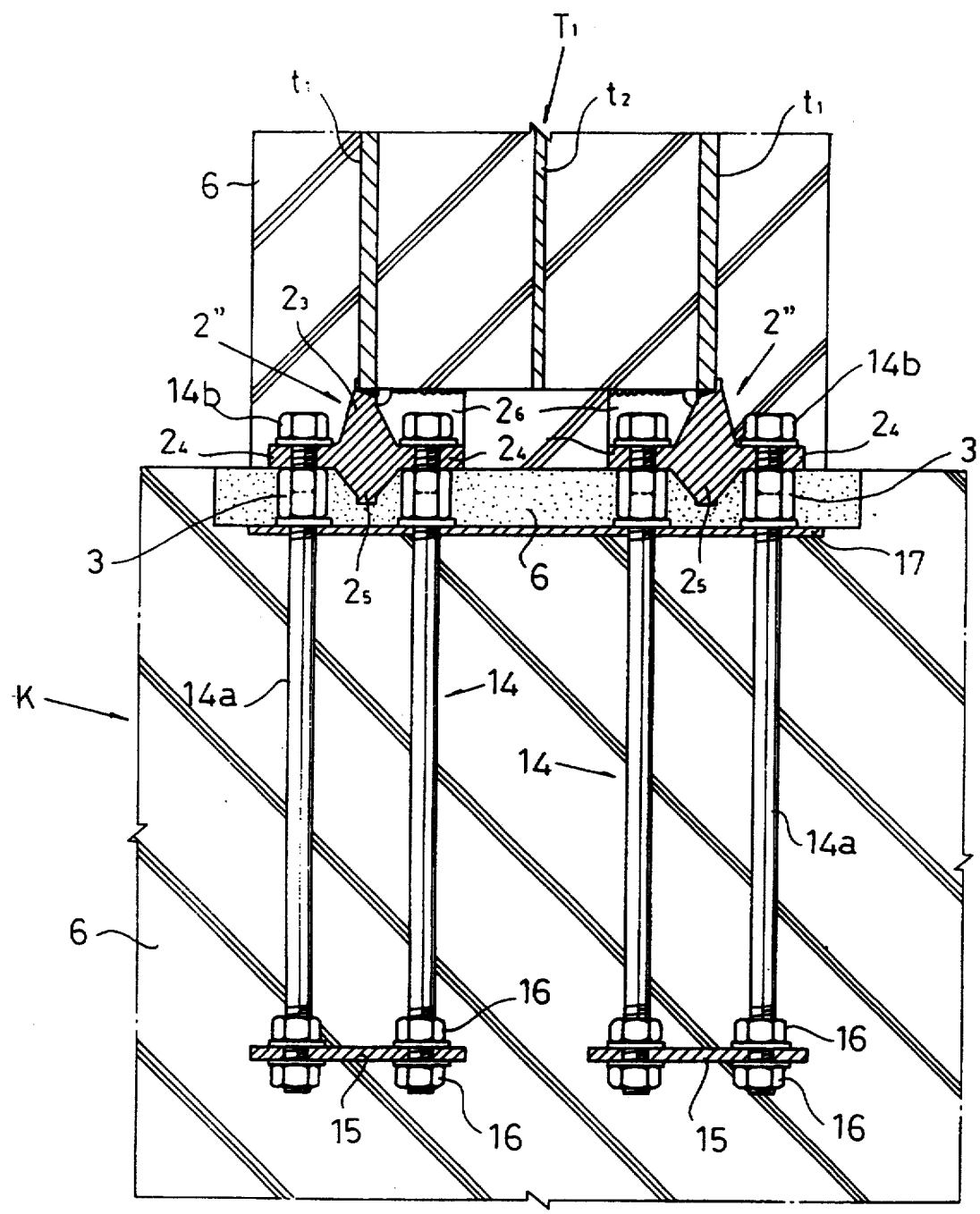
FIG. 46 is a longitudinal sectional view showing a junction of the column base in case of using a junction hardware of a weld type shown in FIG. 50.
Figure 48:
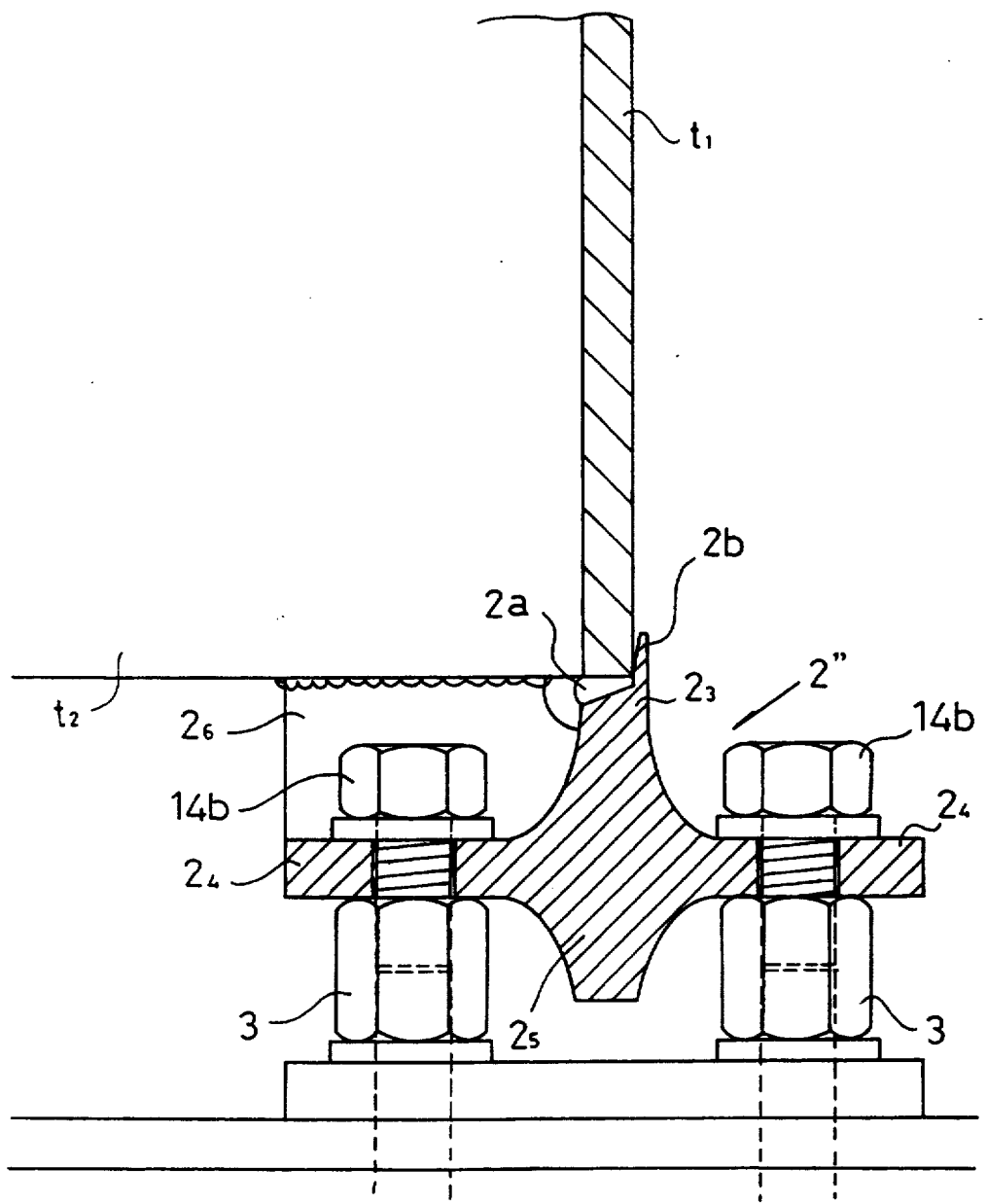
FIG. 48 is a partially enlarged-scale view of FIG. 46.
Figure 49:
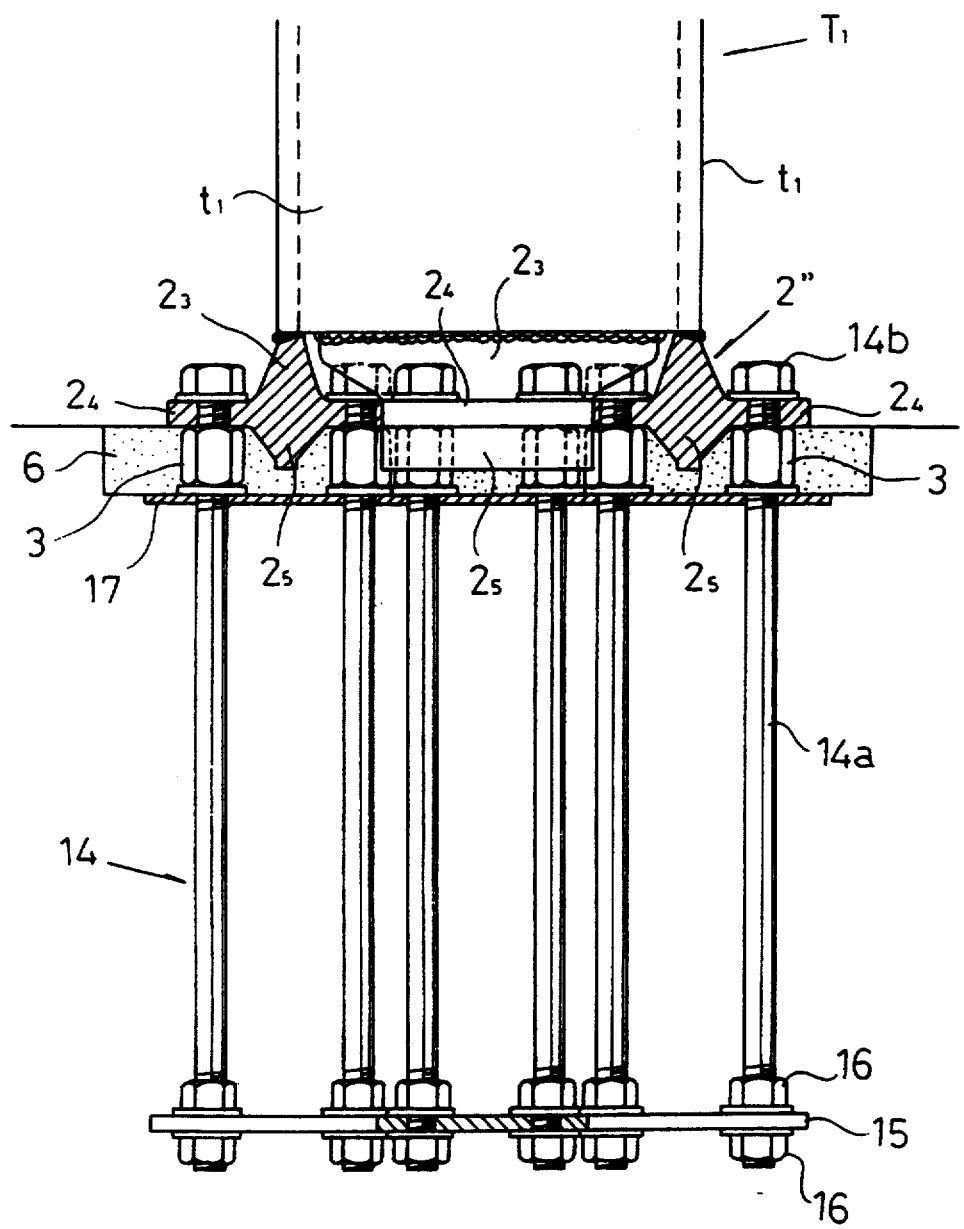
FIG. 49 is a longitudinal sectional view showing a junction for connecting the steel column with a closed shape in section to the concrete base using the metal connectors of a weld type shown in FIG. 51.

The junction hardware 2" is composed of the web $2_3$ connected either by tightening the bolts 4 to the flange $t_1$ of the steel column $T_1$, as shown in FIG. 43 through FIG. 45, or by welding to the edge portion of the flange $t_1$, as shown in FIGS. 46, 48 and 49, the flange $2_4$ perpendicularly bent from the web and passed through by the anchor bolt 14, and the shear key $2_5$ formed along the flange $t_1$ on the side of the concrete base K of the flange $2_4$ and continuing to the web $2_3$. The shearing force from the flange $t_1$ of the steel column $T_1$ is transmitted to the concrete base K by burying this shear key $2_5$ in the concrete base K.

FIGS. 43 and 44 show an embodiment for use either with the junction hardware 2" of such a type as connected by tightening a bolt to the steel column $T_1$, or with the steel column $T_1$ having an H-shaped cross-section.

For the bolt connection type, the junction hardware 2", 2" are provided on both sides of the flange $t_1$ while the web $2_3$ is connected to the steel column $T_1$ by tightening the bolts 4 passed through the overlapping web $2_3$ and flange $t_1$, and the anchor bolt 14 is passed through and firmly connected to the flange $2_4$.

The junction hardware 2" arranged on the outside of the flanges $t_1$ of the steel column $T_1$ has sufficient length to cross the total width of the flange $t_1$ as shown in FIG. 44, and the junction hardware 2" provided on the inside thereof is divided by the web $t_2$. The junction hardware 2", 2" function as a couple on both sides of the flange $t_1$, but in some cases it may be good enough to provide them only on one side of the flange $t_1$ depending on the sizes of the shearing force from the flange $t_1$. The junction hardware 2", 2" are preliminarily connected to the flange $t_1$ of the steel column $T_1$.

The junction hardware 2" of this bolt connection type overlaps the flange $t_1$ of the steel column $T_1$ from the web $2_3$ to the shear key $2_5$ as shown in FIG. 45, and this junction hardware 2" is connected to the flange $t_1$ while the lower edge of the shear key $2_5$ corresponds to the lower edge of the flange $t_1$, and is buried in the concrete base K together with the flange $t_1$. While the flange $t_1$ is reinforced against the shearing force by this junction hardware 2" at the lower edge and ultimately to the concrete base K.

The assembly of the junction shown in FIG. 43 includes the following steps.

To begin with, an anchor plate 15 is connected to the bottom end of the anchor bolt 14 by tightening the nuts 16, 16, and a template 17 for ensuring the precise installation of the steel column $T_1$ connected to the top end. The positioning of the anchor bolt 14 is made by this template 17, and the anchor bolt is set within the concrete base K before placing the concrete 6.

In the illustrated embodiment, after the introduction of the tensile force into the anchor bolt 14, the junction hardware 2" is connected to the anchor bolt. The anchor bolt 14 is composed of an axial portion 14a with cut male threads on both ends which is connected to the anchor plate 15 and the template 17 and buried in the concrete base K. A bolt portion 14b is connected to the axial portion 14a from the surface side of the junction hardware 2". The illustrated embodiment has a coupler 3 for connecting the axial portion 14a and the bolt portion 14b.

After the installation of the anchor bolt 14 and the anchor plate 15, the concrete 6 is under and around the template 17 as illustrated. After the strength appearance of the concrete 6, the coupler 3 is connected to the top end of the axial portion 14a of the anchor bolt 14 and tightened to introduce the tensile force into the anchor bolt 14. The template 17 also plays a role as an anchor plate at the firm connection time of this coupler 3.

Subsequently, the junction hardware 2" is connected to the anchor bolt 14 by placing each flange $2_4$ of the junction hardware 2" on the coupler 3 and by tightening the bolt portion 14b of the anchor bolt 14 screwed in the coupler 3. In this embodiment, as above-mentioned, the bottom ends of the shear keys $2_5$, $2_5$ of the junction hardware 2'', 2'' are corresponded to the bottom end of the flange $t_1$, and therefore, the steel column $T_1$ is inserted within the cut-out together with the shear key $2_5$. The flange $2_4$ in the junction hardware 2'' is positioned on the top end surface of the concrete base K as shown in FIGS. 43 and 44.

After the completion of the junction between the junction hardware 2'', 2'' and the anchor bolt 14, the concrete 6 and mortar are packed in the cut-out formed on the template 17, and the junction of the base of the column is completed by the hardening thereof.

Furthermore, in some cases, the column is made in a steel framed reinforced concrete construction by placing the concrete 6 around the steel column $T_1$ as illustrated.

FIGS. 46, 47 and 48 show an example of the junction hardware 2'' of a type connected to the steel column $T_1$ by welding.

Figure 50:
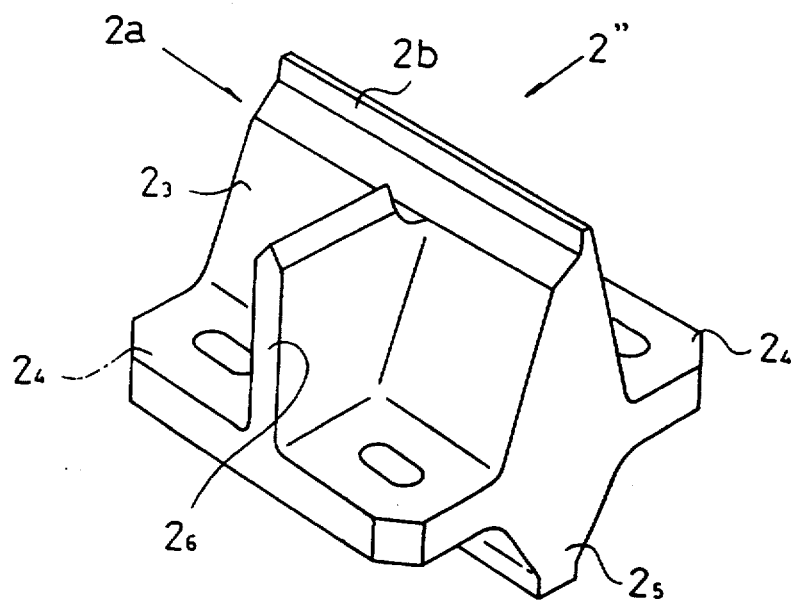
FIG. 50 is a perspective view showing a junction hardware of a weld type used in the steel column with an opened shape in section.
Figure 51:
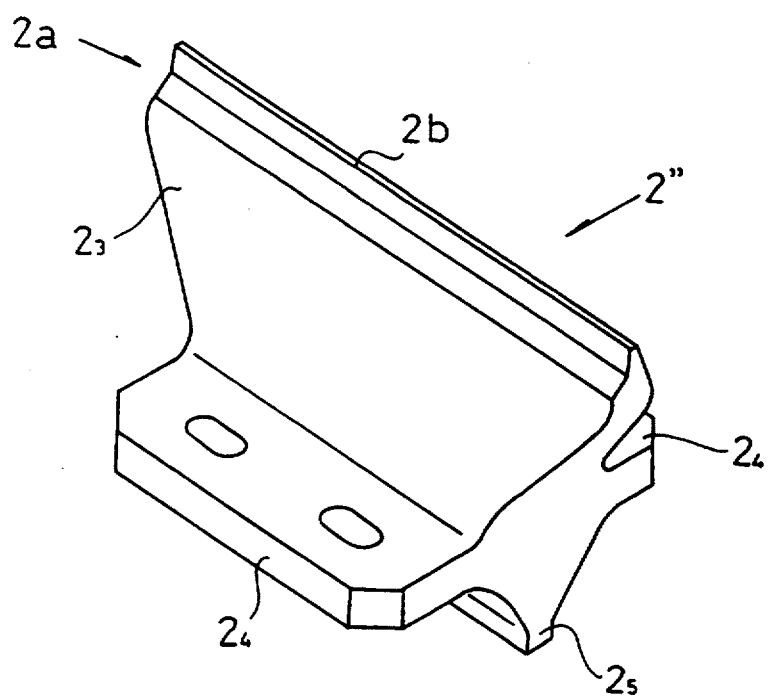
FIG. 51 is a perspective view showing a junction hardware of a weld type used in the steel column with a closed shape in section.

The junction hardware 2'' to be welded is placed at the bottom end of the column base, and the steel column $T_1$ is placed thereon. Therefore, in order to provide continuity with the column base as shown in FIGS. 50 and 51, the junction hardware 2'' has a cross-sectional (plan) shape corresponding to the sectional shape of the steel column $T_1$. In case the steel column $T_1$ is in a form of an open crossed-H as the embodiment shown in FIGS. 46 and 47, a rib $2_6$ perpendicular to the web $2_3$ and to the flanges $2_4$, and continuing and connected to the web $t_2$ of the column base by welding protrudes as shown in FIG. 50. The shearing force of the steel column $T_1$ is transmitted to the concrete base K from the web $t_2$ as well by this rib $2_6$.

In the embodiment shown in FIG. 49, the steel column $T_1$ has a box cross-section and the junction hardware 2'' has a cross-sectional shape with the web $2_3$ continuous therearound. In this case, as it is necessary to prevent the flanges $2_4$, $2_4$ of the neighboring junction hardware 2'', 2'' from interfering with each other on the concrete base K, the available area for the flange $2_4$ around the steel column $T_1$ is restricted. Therefore, only the flat area corresponding to that of the flange $2_4$ of the junction hardware 2'' of the embodiment described above is given to the flange $2_4$. As shown in FIGS. 49 and 51, however, the shearing force from the flange $t_1$ is transferred from the web $2_3$ to the shear key $2_5$ by giving a length corresponding to that of the flange $t_1$ of the steel column $T_1$ to a top end $2b$ thereof, and therefore, it can be smoothly transmitted to the concrete base K.

The junction hardware 2'' of this welded type is connected to the flange $t_1$ of the steel column $T_1$ by butt welding. The flange $2_4$ is placed on the coupler 3 in a similar manner as the junction hardware 2'' of the bolt connection type, and connection by firmly tightening the bolt portion $14b$ of the anchor bolt 14.

As the web $2_3$ continues to the bottom end of the flange $t_1$ of the steel column $T_1$ and is welded thereto, in the case where junction hardware 2'' of the welded type is used, the bottom end of the steel column $T_1$ appears to float above the top end of the concrete base K as shown in FIG. 49. However, the structure of the anchor bolt 14 and the concrete base K and the points of assembly are the same as those when using the junction hardware 2'' of the bolt connection type.

The details of the junction hardware 2'' of the bolt connection type used for the connection between the open cross-section steel column $T_1$ and the concrete base K are now explained, even though the above-mentioned content is repeated once again.

This junction hardware 2'' is formed in a T-form closed to L-form in section as shown in FIG. 43, by the web $2_3$ overlapping on the flange $t_1$ of the steel column $T_1$ and connected to the flange $t_1$ by the bolts 4. The flange $2_4$ protrudes perpendicularly to one side of the web and is connected to the anchor bolt 14. The shear key $2_4$ protrudes from the web $2_3$ on the side of the concrete base K of the flange $2_4$, and transfers the shearing force from the flange $t_1$ of the steel column $T_1$ to the concrete base K.

A plurality of bolts 4 pass through the bolt holes in the web $2_3$ and the flange $t_1$, as shown in FIG. 45 which is a partial enlarged-scale view of FIG. 43, and the bolt portion $14b$ of the anchor bolt 14 protrudes through the bolt holes into the flange $2_4$.

The basic shape of the junction hardware 2'' and attachment to the steel column $T_1$ are as described above. The junction hardware 2'' provided on the outside of the flange $t_1$ has the corresponding width to that of the flange $t_1$, and the junction hardware 2'' provided on the inside thereof has a width within the range of the effective length of the flange $t_1$ and overlapped on the flange $t_1$ of the steel column $T_1$ along the whole length, and connected by tightening the bolt 4 while a bottom end thereof corresponds with the bottom end of the shear key $2_5$. In this manner, the junction hardware 2'' increases the plate thickness of the flange $t_1$ in the column base portion to provide reinforcement, and simultaneously, the shearing force from the flange $t_1$ is transmitted as a bearing pressure force by burying the junction hardware 2'' in the concrete base K together with flange $t_1$.

Furthermore, for the purpose of increasing the resistant force against the bending moments applied on the shear key $2_5$ when transmitting the shearing force as shown in FIGS. 43 and 45, the portion from the web $2_3$ to the flange $2_4$ and that from the shear key $2_5$ to the flange $2_4$ are gradually enlarged resulting in increasing the plate thickness of the basic portions of the web $2_3$ and the shear key $2_5$.

Then, the details of the junction hardware 2'' of the welded type will be explained.

As shown in FIGS. 46 and 49, this junction hardware 2'' has a continuous web $2_3$ in the form of a cross welded to the bottom end of the flange $t_1$ of the steel column $T_1$. The flanges $2_4$, $2_4$ protrude perpendicularly from the web on both sides thereof and connect to the anchor bolt 14. The shear key $2_5$ protrudes from the web $2_3$ on the side of the concrete base K of the flange $2_4$. The bolt hole for the anchor bolt 14 is bored in the flanges $2_4$, $2_4$ and the section of the portion between the web $2_3$ and the shear key $2_5$ is enlarged in a similar manner as the junction hardware 2'' of the bolt connection type.

The junction hardware 2'' of this welding type is positioned at the bottom end of the steel column $T_1$ and supports the steel column $T_1$, since the web $2_3$ continues to the flange $t_1$ of the steel column $T_1$.

FIG. 50 shows a product example of the junction hardware 2'' applicable to the steel column $T_1$ welded to the web $t_2$ of the column base perpendicularly to the plane of one flange $2_4$. The web $2_3$ and rib $2_6$ transmit the shearing force from the web $t_2$ which has, in particular, an H-shape or cross H-shape in section.

FIGS. 46 and 47 show a junction when using this junction hardware 2'', and the arrangement is similar to that of the embodiment shown in FIG. 43, excluding the fact that the steel column $T_1$ is placed on the junction hardware 2" and the flange $t_1$ and the web $t_2$ are welded to the web $2_3$ and the rib $2_6$, respectively.

FIG. 51 shows a product example of the junction hardware 2" applicable to a box-shaped steel column $T_1$. In this case, the length of the flange $2_4$ is smaller than the width of the flange $t_1$ of the steel column $T_1$ as mentioned above since it is necessary to avoid the mutual interference between the flanges $2_4$, $2_4$ at the corner portion of the steel column $T_1$. The flange $2_4$ is positioned at the intermediate portion of the flange $t_1$ as shown in FIG. 49. The web $2_3$ is in the vertical form of a fan gradually increasing in width upwards from the side of the flange $2_4$ corresponding to the width of the flange $t_1$. The top end of the web $2_3$ has an enough width to cross the whole width of a piece of the flange $t_1$. This junction hardware 2" is shown installed in FIG. 49.

As shown in FIGS. 50 and 51 and as described above in the embodiment of the column and beam junction shown in FIG. 30, the groove $2a$ for butting against the flange $t_1$ of the steel column $T_1$ and welding to it is formed and a backing reinforcing plate $2b$ is monolithically protruded from the back surface, resulting in a simplified welding operation on the upper surface of the web $2_3$ of the junction hardware 2" of the welded type shown in FIG. 46 through FIG. 51. As above-mentioned, however, by slightly angling this reinforcing plate $2b$ to the welded side as shown in FIG. 48, the shrinkage deformation after the welding of this reinforcing plate $2b$ with a welded metal is taken into consideration. After the completion of welding, the reinforcing plate $2b$ is deformed to the side of the flange $t_1$ and it can be adhered to the flange $t_1$ without generating any residual stress at the welded portion.

Finally, a junction structure will be explained which connects the steel member T such as steel beams to the structural member K which is a reinforced concrete member such as reinforced concrete beams by connecting both a strap-shape junction hardware 2 and the corresponding steel reinforcement 18 to the metal connector 1 used in the column and beam junction with a coupler 3.

The steel member T and the structural member K as a reinforced concrete member are connected to each other by making the junction hardware 2 connect to the steel member T at the plate portion $2_1$ and burying the steel reinforcement 18 in the concrete 6 of the structural member K and then screwing them into the coupler 3 from both sides.

An embodiment shown in FIG. 52 through FIG. 56 is an effective junction structure particularly when the construction of the structural member K is completed and then the connection between the steel member T and the structural member K is carried out. For example, at the completion time of a structure, any members for connection cannot be protruded since the surroundings of the structural member such as side columns or corner columns have to be finished. However, in case any additions are necessary after the completion of the structure, any additional members have to be newly protruded so as to connect the steel member T. The embodiment shown here does not need any protruding of members or the like, and it allows connection of the steel member T directly to the side surface or the surface of a completed structural member.

Herein, the edge portion of the steel reinforcement 18 buried in the concrete 6 of the structural member K is cut so as to have thread corresponding to the bolt portion $1_1$ of the metal connector 1, and the steel reinforcement 18 is used as a metal connector 1 by burying the coupler 3, with which the thread matches, in the concrete 6 on the surface side thereof. Then, an addition can be attached by screwing the bolt portion $2_2$ of the junction hardware 2 into the coupler 3.

Figure 52:
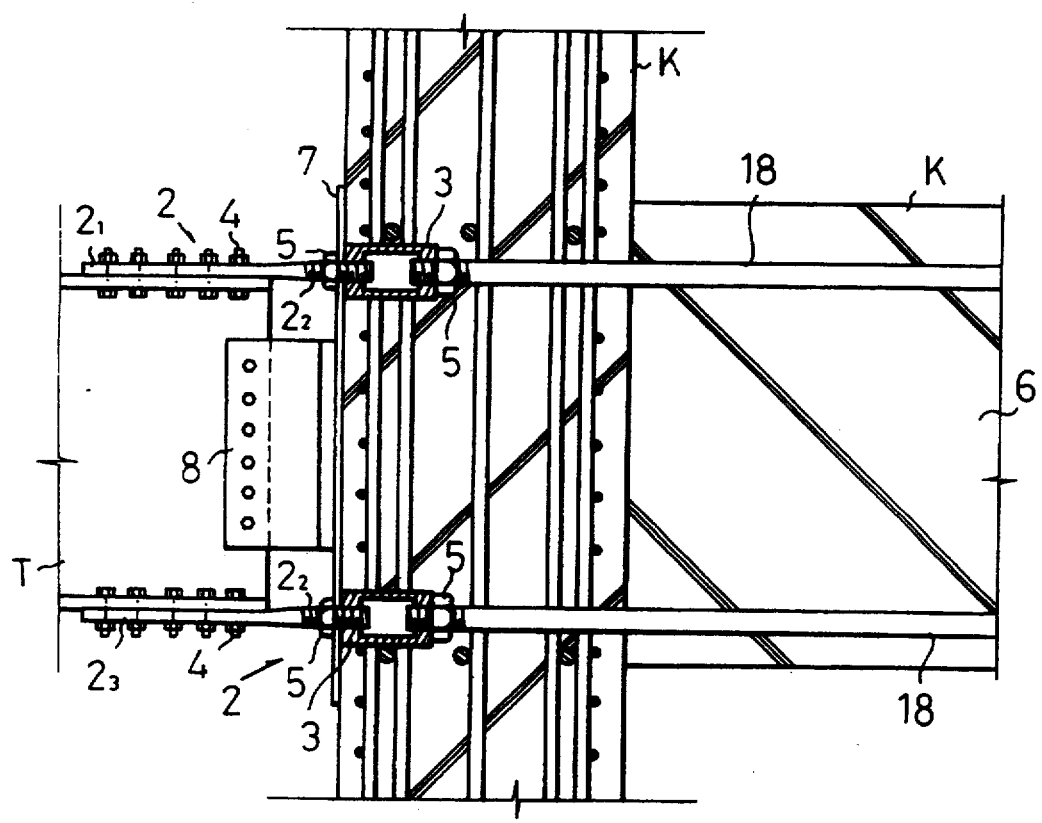
FIG. 52 is a longitudinal sectional view showing a junction between a column and beams for connecting the steel beams as a steel member to the beams as a structural member of a reinforced concrete construction by utilizing reinforcing bars as a metal connector and also using a coupler and a junction hardware with a strap shape.
Figure 53:
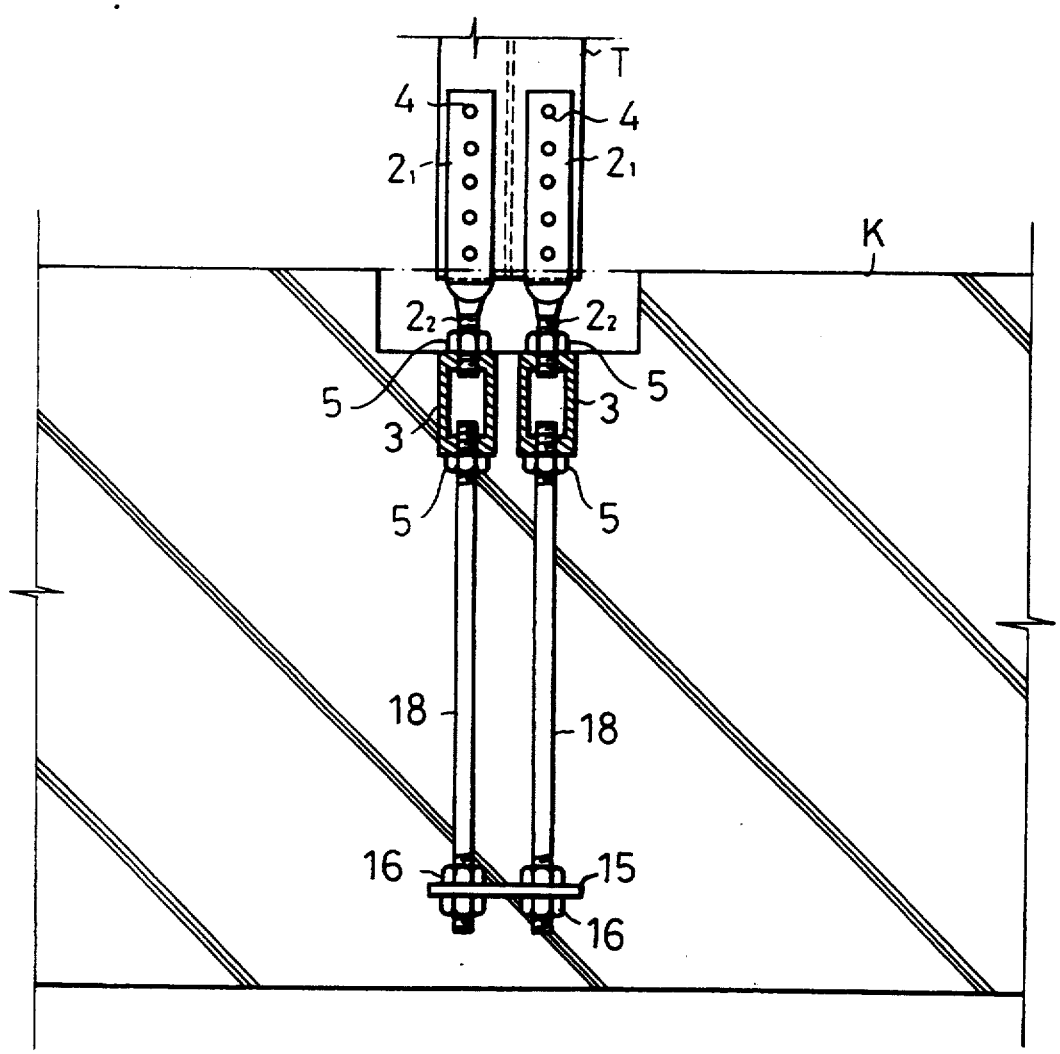
FIG. 53 is a longitudinal sectional view showing a junction of the column base for connecting the steel column as a steel member to the concrete base as a structural member of a reinforced concrete construction using anchor bolts corresponding to metal connectors and junction hardware with a strap shape.

The coupler 3 is buried on the side connected to the steel member T of the structural member K at the completion time of the structure and the edge surface on the side of the steel member T faces the surface of the structural member K as shown in FIGS. 52 and 53.

At the completion of a reinforced concrete construction structure, the steel reinforcement 18 of the structural member K is screwed into the coupler 3, and the steel member T is connected to the structural member K by screwing the junction hardware 2 into the opposite end of the coupler 3.

Figure 54:
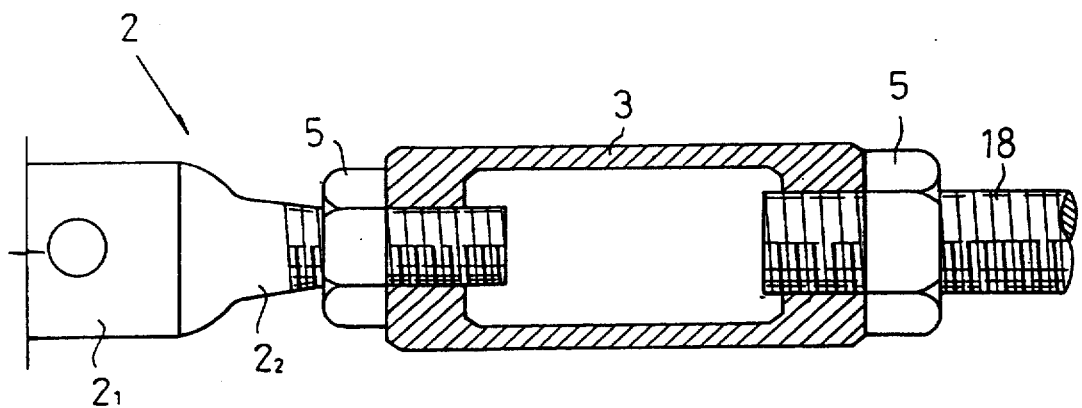
FIGS. 54 and 55 are sectional views showing the appearance in screwing either junction hardware and reinforcing bars or anchor bolts into couplers to connect in a form of screw joint, respectively.
Figure 55:
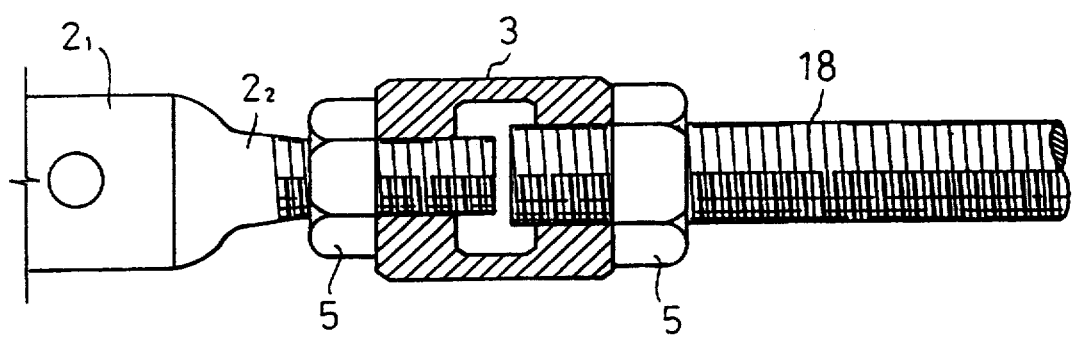

FIGS. 54 and 55 show the details wherein the steel reinforcement 18 is connected to the coupler 3 by screw joints, and in this case, both edges of the coupler 3 are arranged to have cut male threads. The screw of the steel reinforcement 18 screwed in the coupler 3 is tightened to the bolt $2_2$ of the junction hardware 2 with the nuts 5, 5 and a sufficient axial force is given to firmly connect both of them to the coupler 3.

FIG. 54 shows a connection example where the length of the coupler 3 is long and there is a distance between the steel reinforcement 18 and the junction hardware 2, and FIG. 55 shows the same but where the length of the coupler 3 is small, that is, the steel reinforcement 18 and the junction hardware 2 approach each other.

Figure 56:
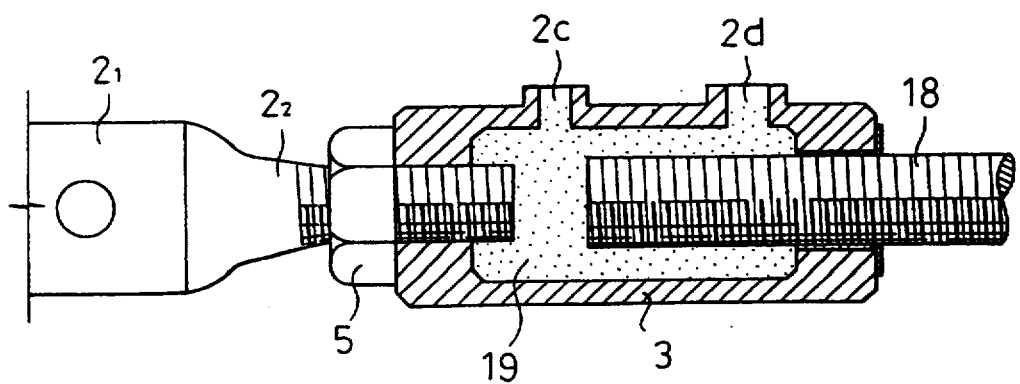
FIG. 56 is a sectional view showing the appearance in connecting the junction hardware by screw joints and also the reinforcing bars and the anchor bolts by sleeve joints due to the adhesion of a packing material.

FIG. 56 shows the details in case the metal connector 1 is connected to the coupler 3 by means of a sleeve joint utilizing the adhesion of the packing material 19 such as nonshrinkable mortar, packed in the internal portion.

In this case, an injection hole $2c$ and an exhaust hole $2d$ are bored in the side surface of the coupler 3, and the packing material 19 is packed from the injection hole $2c$ to fill the space therein. The packed condition of the packing material 19 can be confirmed by the fact that it is exhausted from the exhaust hole $2d$. In case of this joint method, the steel reinforcement 18 may be a round steel bar without any threads, but it is proper to use a steel reinforcement attached with threads and ribs as illustrated for increasing the adhesion strength.

FIG. 52 shows a connection example wherein the structural member K is a beam or a column in a reinforced concrete construction and the steel member T is a beam, and the steel reinforcement 18 is used as a metal connector 1 in the column and beam junction prior to FIG. 42 by extending the steel reinforcement 18 of the beam of the structural member K to the column side, and thus the connection between the beam of the structural member K and the beam of the steel member T is done. The beam of the structural member K in this case can be construed by a placed concrete construction or by a precast concrete construction.

In case of constructing a cast-in-place concrete construction structural member K, the assembly of the junction is done to ensure reinforcement of the columns and beams, including the steel reinforcement 18 connected to the coupler 3, placing the coupler 3 at a required position and then placing the concrete 6 for the column and beam of the structural member K.

In case of connecting the steel member T to the structural member K after the concrete is poured, in order to make additions after the construction time, the bolt portion $2_2$ of the junction hardware 2 is connected to the coupler 3 after waiting of both the hardening and the strength appearance of the concrete 6 of the structural member K, and the junction hardware 2 is firmly connected by tightening the nut 5. Then, the connection of the steel member T to the structural member K is completed by connecting the flange of the steel member T to the upper and lower junction hardware 2, 2 by tightening the bolts 4.

Furthermore, when the steel member T is a beam, the gusset plate 8 for transmitting the shearing force is connected to the side surface of the column of the structural member K as shown in FIG. 52, and this gusset plate 8 and the web of the steel member T are connected by means of bolts. In this embodiment, the restriction plate 7 is provided to the side surface on the side of the steel member T of the column similar to the embodiment shown in FIGS. 1 and 2, and the gusset plate 8 is connected to this restriction plate 7.

FIG. 53 shows an embodiment wherein the structural member K is a reinforced concrete construction base similar to the concrete base shown in FIG. 43 through FIG. 49, and the steel member T is a steel column.

In this case, the steel reinforcement 18, corresponding to the anchor bolt 14 in the embodiment shown in FIG. 43 through FIG. 49, is anchored in the concrete 6 by the anchor plate 15 connected to the bottom end of the steel reinforcement by tightening the nut 16, and the top end of the coupler 3 is positioned flush with the surface of the cut-out portion from the top end so as to make the steel member T supported directly on the concrete 6 of the structural member K. In a similar manner as the embodiment shown in FIG. 52, both the coupler 3 and the steel reinforcement 18 are preliminarily buried in the concrete 6 of the structural member K.

In this embodiment, the connection of the junction hardware 2 to the coupler 3 is also done after the hardening of the concrete 6 of the structural member K, and then, the connection of the steel member T to the junction hardware 2 is done by tightening the bolts 4.

After the connection of the steel member T, the junction of the column base is constructed by packing the concrete 6 in the cut-out portion of the concrete 6.

In this embodiment, the gusset plate 8 can be omitted by burying the bottom end of the steel member T in the structure member K and by transmitting the shearing force to the concrete 6 as a bearing pressure force.

In addition, since the steel member T is a column, the steel column in an H-shape, cross or closed form in cross-section can be used in this embodiment.

What is claimed is:

1. A junction structure, comprising:
   a vertical column, said vertical column being a reinforced concrete column;
   a steel beam to be horizontally connected to the reinforced concrete column, the steal beam having a flange;
   a plurality of rod-like metal connectors intersecting at right angles with each other in their intermediate portions within an internal portion of the reinforced concrete column, each of said metal connectors having bolt portions at both ends;
   a coupler having two ends, one end of the coupler being connected to the bolt portion of one of the metal connectors; and
   a junction hardware to be connected to the flange of the steel beam, the junction hardware being fixed relative to the bolt portion of the metal connector through a second end of the coupler.

2. A junction structure according to claim 1, wherein the intermediate portion of each of the metal connectors has an eccentric flat shape in section with respect to the axis of the bolt portions, and the plurality of metal connectors intersect at right angles with each other at their flat shape portions.

3. A junction structure according to claim 2, wherein the junction hardware is composed of a plate portion overlapping the flange of the steel beam, the plate portion having a plurality of bolt holes to be connected to the flange by tightening with bolts, and a bolt portion extending from said plate portion and having an axis parallel with said plate portion, said bolt portion being connected to the bolt portion of the metal connector through said coupler so that the junction hardware is connected to the metal connector.

4. A junction structure according to claim 2, wherein the junction hardware is a split T-type hardware composed of a web connected to the flange of the steel beam by welding or by tightening with bolts and a flange perpendicular to the web, a bolt passing through said flange of said split T-type hardware is connected to the bolt portion of the metal connector through said coupler so that the junction hardware is connected to the metal connector.

5. A junction structure according to claim 2, wherein the junction hardware is a L-shaped hardware having a web overlapping the flange of the steel beam and a plurality of bolt holes on the web to connect the web to the flange of the steel beam by tightening with bolts and a flange perpendicularly extending from one side of the web, a bolt passing through said flange of said L-shaped hardware is connected to the bolt portion of the metal connector through said coupler so that the junction hardware is connected to the metal connector.

6. A junction structure according to claim 2, wherein the junction hardware is a T-shaped hardware having a web overlapping on the flange of the steel beam and a plurality of bolt holes on the web to connect the web to the flange of the steel beam by tightening with bolts and a flange perpendicularly extending from both sides of the web, a bolt passing through said flange of said T-shaped hardware is connected to the bolt portion of the metal connector through said coupler so that the junction hardware is connected to the metal connector.

7. A junction structure according to claim 2, wherein the junction hardware is a T-shaped hardware having a web connected to the flange of the steel beam by welding and a flange perpendicularly extending from both sides of the web, a bolt passing through said flange of said T-shaped hardware is connected to the bolt portion of the metal connector through the coupler so that the junction hardware is connected to the metal connector.

8. A junction structure according to claim 1, wherein a through hole is provided in the intermediate portion of one of the metal connectors perpendicular to a longitudinal direction of said metal connector, and another metal connector is in a form of steel rod sized to pass perpendicularly through the through hole.

9. A junction structure according to claim 8, wherein the junction hardware is composed of a plate portion overlapping the flange of the steel beam, the plate portion having a plurality of bolt holes to be connected to the flange by tightening with bolts, and a bolt portion extending from said plate portion and having an axis parallel with said plate portion, said bolt portion being connected to the bolt portion of the metal connector through said coupler so that the junction hardware is connected to the metal connector.

10. A junction structure according to claim 8, wherein the junction hardware is a split T-type hardware composed of a web connected to the flange of the steel beam by welding or by tightening with bolts and a flange perpendicular to the web, the bolt passing through said flange of said split T-type hardware is connected to the bolt portion of the metal connector through said coupler so that the junction hardware is connected to the metal connector.

11. A junction structure according to claim 8, wherein the junction hardware is a L-shaped hardware having a web overlapping the flange of the steel beam and a plurality of bolt holes on the web to connect the web to the flange of the steel beam by tightening with bolts and a flange perpendicularly extending from one side of the web, a bolt passing through said flange of said L-shaped hardware is connected to the bolt portion of the metal connector through said coupler so that the junction hardware is connected to the metal connector.

12. A junction structure according to claim 8, wherein the junction hardware is a T-shaped hardware having a web overlapping the flange of the steel beam and a plurality of bolt holes on the web to connect the web to the flange of the steel beam by tightening with bolts and a flange perpendicularly extending from both sides of the web, a bolt passing through said flange of said T-shaped hardware is connected to the bolt portion of the metal connector through said coupler so that the junction hardware is connected to the metal connector.

13. A junction structure according to claim 8, wherein the junction hardware is a T-shaped hardware having a web connected to the flange of the steel beam by welding and a flange perpendicularly extending from both sides of the web, a bolt passing through said flange of said T-shaped hardware is connected to the bolt portion of the metal connector through said coupler so that the junction hardware is connected to the metal connector.

14. A junction structure according to claim 1, wherein the intermediate portion of each of the metal connectors is curved against the bolt portions at both ends, an axial center of said curve is eccentric with respect to an axis of the bolt portions, and the metal connectors intersect at right angles with each other at their intermediate portions.

15. A junction structure according to claim 14, wherein the junction hardware is composed of a plate portion overlapping the flange of the steel beam, the plate portion having a plurality of bolt holes to be connected to the flange by tightening with bolts, and a bolt portion extending from said plate portion and having an axis parallel with said plate portion, said bolt portion being connected to the bolt portion of the metal connector through said coupler so that the junction hardware is connected to the metal connector.

16. A junction structure according to claim 14, wherein the junction hardware is a split T-type hardware composed of a web connected to the flange of the steel beam by welding or by tightening with bolts and a flange perpendicular to the web, a bolt passing through said flange of said split T-type hardware is connected to the bolt portion of the metal connector through said coupler so that the junction hardware is connected to the metal connector.

17. A junction structure according to claim 14, wherein the junction hardware is a L-shaped hardware having a web overlapping the flange of the steel beam and a plurality of bolt holes on the web to connect the web to the flange of the steel beam by tightening with bolts and a flange perpendicularly extending from one side of the web, a bolt passing through said flange of said L-shaped hardware is connected to the bolt portion of the metal connector through said coupler so that the junction hardware is connected to the metal connector.

18. A junction structure according to claim 14, wherein the junction hardware is a T-shaped hardware having a web overlapping the flange of the steel beam and a plurality of bolt holes on the web to connect the web to the flange of the steel beam by tightening with bolts and a flange perpendicularly extending from both sides of the web, a bolt passing through said flange of said T-shaped hardware is connected to the bolt portion of the metal connector through said coupler so that the junction hardware is connected to the metal connector.

19. A junction structure according to claim 14, wherein the junction hardware is a T-shaped hardware having a web connected to the flange of the steel beam by welding and a flange perpendicularly extending from both sides of the web, a bolt passing through said flange of said T-shaped hardware is connected to the bolt portion of the metal connector through said coupler so that the junction hardware is connected to the metal connector.

20. A junction structure according to claim 1 wherein said vertical column is a steel column having a closed shape in section and packed with concrete therein.

21. A junction structure according to claim 20, wherein the intermediate portion of each of the metal connectors has an eccentric flat shape in section with respect to the axis of the bolt portions, and the plurality of metal connectors intersect at right angles with each other at their flat shape portions.

22. A junction structure according to claim 21, wherein the junction hardware is composed of a plate portion overlapping the flange of the steel beam, the plate portion having a plurality of bolt holes to be connected to the flange by tightening with bolts, and a bolt portion extending from said plate portion and having an axis parallel with said plate, said bolt portion being connected to the bolt portion of the metal connector through said coupler so that the junction hardware is connected to the metal connector.

23. A junction structure according to claim 21, wherein the junction hardware is a split T-type hardware composed of a web connected to the flange of the steel beam by welding or by tightening with bolts and a flange perpendicular to the web, a bolt passing through said flange of said split T-type hardware is connected to the bolt portion of the metal connector through said coupler so that the junction hardware is connected to the metal connector.

24. A junction structure according to claim 21, wherein the junction hardware is a L-shaped hardware having a web overlapping the flange of the steel beam and a plurality of bolt holes on the web to connect the web to the flange of the steel beam by tightening with bolts and a flange perpendicularly extending from one side of the web, a bolt passing through said flange of said L-shaped hardware is connected to the bolt portion of the metal connector through said coupler so that the junction hardware is connected to the metal connector.

25. A junction structure according to claim 21, wherein the junction hardware is a T-shaped hardware having a web overlapping the flange of the steel beam and a plurality of bolt holes on the web to connect the web to the flange of the steel beam by tightening with bolts and a flange perpendicularly extending from both sides of the web, a bolt passing through said flange of said T-shaped hardware is connected to the bolt portion of the metal connector through said coupler so that the junction hardware is connected to the metal connector.

26. A junction structure according to claim 21, wherein the junction hardware is a T-shaped hardware having a web connected to the flange of the steel beam by welding and a flange perpendicularly extending from both sides of the web, a bolt passing through said flange of said T-shaped hardware is connected to the bolt portion of the metal connector through said coupler so that the junction hardware is connected to the metal connector.

27. A junction structure according to claim 20, wherein a through hole is provided in the intermediate portion of one of the metal connectors perpendicular to a longitudinal direction of said metal connector, and another metal connector is in a form of steel rod sized to pass perpendicularly through the through hole.

28. A junction structure according to claim 27, wherein the junction hardware is composed of a plate portion overlapping the flange of the steel beam, the plate portion having a plurality of bolt holes to be connected to the flange by tightening with bolts, and a bolt portion extending from said plate portion and having an axis parallel with said plate portion, said bolt portion being connected to the bolt portion of the metal connector through said coupler so that the junction hardware is connected to the metal connector.

29. A junction structure according to claim 27, wherein the junction hardware is a split T-type hardware composed of a web connected to the flange of the steel beam by welding or by tightening with bolts and a flange perpendicular to the web, a bolt passing through said flange of said split T-type hardware is connected to the bolt portion of the metal connector through said coupler so that the junction hardware is connected to the metal connector.

30. A junction structure according to claim 27, wherein the junction hardware is a L-shaped hardware having a web overlapping the flange of the steel beam and a plurality of bolt holes on the web to connect the web to the flange of the steel beam by tightening with bolts and a flange perpendicularly extending from one side of the web, a bolt passing through said flange of said L-shaped hardware is connected to the bolt portion of the metal connector through said coupler so that the junction hardware is connected to the metal connector.

31. A junction structure according to claim 27, wherein the junction hardware is a T-shaped hardware having a web overlapping the flange of the steel beam and a plurality of bolt holes on the web to connect the web to the flange of the steel beam by tightening with bolts and a flange perpendicularly extending from both sides of the web, a bolt passing through said flange of said T-shaped hardware is connected to the bolt portion of the metal connector through said coupler so that the junction hardware is connected to the metal connector.

32. A junction structure according to claim 27, wherein the junction hardware is a T-shaped hardware having a web connected to the flange of the steel beam by welding and a flange perpendicularly extending from both sides of the web, a bolt passing through said flange of said T-shaped hardware is connected to the bolt portion of the metal connector through said coupler so that the junction hardware is connected to the metal connector.

33. A junction structure according to claim 20, wherein the intermediate portion of each of the metal connectors is curved against the bolt portions at both ends, an axial center of said curve is eccentric with respect to an axis of the bolt portions, and the metal connectors intersect at right angles with each other at their intermediate portions.

34. A junction structure according to claim 33, wherein the junction hardware is composed of a plate portion overlapping the flange of the steel beam, the plate portion having a plurality of bolt holes to be connected to the flange by tightening with bolts, and a bolt portion extending from said plate portion and having an axis parallel with said plate portion, said bolt portion being connected to the bolt portion of the metal connector through said coupler so that the junction hardware is connected to the metal connector.

35. A junction structure according to claim 33, wherein the junction hardware is a split T-type hardware composed of a web connected to the flange of the steel beam by welding or by tightening with bolts and a flange perpendicular to the web, a bolt passing through said flange of said split T-type hardware is connected to the bolt portion of the metal connector through said coupler so that the junction hardware is connected to the metal connector.

36. A junction structure according to claim 33, wherein the junction hardware is a L-shaped hardware having a web overlapping the flange of the steel beam and a plurality of bolt holes on the web to connect the web to the flange of the steel beam by tightening with bolts and a flange perpendicularly extending from one side of the web, a bolt passing through said flange of said L-shaped hardware is connected to the bolt portion of the metal connector through said coupler so that the junction hardware is connected to the metal connector.

37. A junction structure according to claim 33, wherein the junction hardware is a T-shaped hardware having a web overlapping the flange of the steel beam and a plurality of bolt holes on the web to connect the web to the flange of the steel beam by tightening with bolts and a flange perpendicularly extending from both sides of the web, a bolt passing through said flange of said T-shaped hardware is connected to the bolt portion of the metal connector through said coupler so that the junction hardware is connected to the metal connector.

38. A junction structure according to claim 33, wherein the junction hardware is a T-shaped hardware having a web connected to the flange of the steel beam by welding and a flange perpendicularly extending from both sides of the web, a bolt passing through said flange of said T-shaped hardware is connected to the bolt portion of the metal connector through said coupler so that and the junction hardware is connected to the metal connector.

* * * * *